United States Patent
Yoshii

(10) Patent No.: US 10,333,354 B2
(45) Date of Patent: Jun. 25, 2019

(54) CONTACTLESS COMMUNICATION MEDIUM AND ELECTRONIC DEVICE USING THE SAME

(71) Applicant: Rohm Co., Ltd., Kyoto (JP)

(72) Inventor: Yusuke Yoshii, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 252 days.

(21) Appl. No.: 15/442,250

(22) Filed: Feb. 24, 2017

(65) Prior Publication Data

US 2017/0256989 A1    Sep. 7, 2017

(30) Foreign Application Priority Data

Mar. 1, 2016    (JP) .................................. 2016-038988

(51) Int. Cl.
| | |
|---|---|
| *H02J 50/12* | (2016.01) |
| *H04B 5/00* | (2006.01) |
| *H02M 3/335* | (2006.01) |
| *H02M 3/338* | (2006.01) |

(52) U.S. Cl.
CPC ............. *H02J 50/12* (2016.02); *H02M 3/335* (2013.01); *H02M 3/33592* (2013.01); *H04B 5/0037* (2013.01); *H04B 5/0075* (2013.01); *H02M 3/338* (2013.01); *Y02B 70/1475* (2013.01)

(58) Field of Classification Search
None
See application file for complete search history.

(56) References Cited

U.S. PATENT DOCUMENTS

| | | | |
|---|---|---|---|
| 2013/0249479 A1* | 9/2013 | Partovi | ................... H02J 7/025 320/108 |
| 2014/0073243 A1* | 3/2014 | Hijioka | ................ H04B 5/0031 455/41.1 |
| 2017/0133885 A1* | 5/2017 | Chen | ....................... H02J 50/12 |

FOREIGN PATENT DOCUMENTS

| | | |
|---|---|---|
| JP | 3761001 | 1/2006 |
| JP | 4392256 | 10/2009 |
| JP | 2015-202025 | 11/2015 |
| WO | 2002/07173 | 1/2002 |

OTHER PUBLICATIONS

Proximity Communication Interface Implementation Specifications Version 2.0, Mar. 2004, New Media Development Association (with English translation).

* cited by examiner

*Primary Examiner* — Jared Fureman
*Assistant Examiner* — Aqeel H Bukhari
(74) *Attorney, Agent, or Firm* — Fish & Richardson P.C.

(57) ABSTRACT

A contactless communication medium, includes: a coil sensitive to a magnetic field; a rectifying circuit configured to rectify an alternating power energy generated in the coil; a smoothing circuit configured to smooth a rectified output outputted from the rectifying circuit to generate a DC voltage; an output terminal connected to the smoothing circuit; a voltage detecting circuit configured to compare an output voltage extracted from the output terminal with a reference voltage; a switch configured to operate in response to an output from the voltage detection circuit and to attenuate the alternating power energy generated in the coil when the output voltage reaches a predetermined value; and a load connected to the output terminal, wherein impedance of the load has a value such that the output voltage has a (Continued)

predetermined value when an effective value of the magnetic field applied to the coil is 12 A/m or more.

25 Claims, 17 Drawing Sheets

CONTACTLESS COMMUNICATION MEDIUM AND ELECTRONIC DEVICE USING THE SAME

CROSS-REFERENCE TO RELATED APPLICATION

This application is based upon and claims the benefit of priority from Japanese Patent Application No. 2016-38988, filed on Mar. 1, 2016, the entire contents of which are incorporated herein by reference.

TECHNICAL FIELD

The present disclosure relates to a contactless communication medium used in an automatic ticket checking system, an information card system and so on, and an electronic device using the same.

BACKGROUND

Recently, a contactless communication medium using short-range wireless communication is used to transmit and receive information in an automatic ticket checking system, an information card system and so on. In the contactless communication medium, for example, communication and storage of identification number, identification information, value information, credit information or the like are performed. The contactless communication medium includes, for example, a data carrier, and a card-type contactless IC card attached to people, vehicles or goods so as to be used. There is wireless communication based on a near-field communication (NFC) scheme using 13.56 MHz as a carrier frequency as a type of short-range wireless communication.

In the short-range wireless communication, for example, a Qi scheme using a frequency of 100 to 200 KHz, a wireless power consortium (A4WP) scheme using a frequency of 6.78 MHz, and the like have been known in addition to the NFC scheme. Further, A4WP and a power matters alliance (PMA) were merged in November 2015 under a new title of "Air Fuel Alliance" and a wireless scheme thereof is "Air Fuel."

In wireless power feeding, for example, the following two schemes have been well known. A first wireless power feeding scheme is a magnetic resonance scheme. In the magnetic resonance scheme, a power transmission side resonance circuit including a power transmission side coil is used in a power feeder, and a power reception side resonant circuit including a power reception side coil is used in a power receiver. The resonance frequencies of the power transmission side resonance circuit and the power reception side resonance circuit are set at a common predetermined frequency. A magnetic field is generated in the power transmission side coil by allowing an AC current to flow through the power transmission side coil. This magnetic field causes an AC current to flow through the power reception side coil. That is, electric power is supplied from the power transmission side resonance circuit including the power transmission side coil to the power reception side resonance circuit including the power reception side coil. The magnetic resonance scheme is employed as, for example, an A4WP scheme.

A second wireless power feeding scheme is an electromagnetic inductive scheme. In the electromagnetic inductive scheme, two coils are arranged close to each other and a magnetic flux generated by allowing a current to flow through one coil is coupled to the other coil to generate power energy in the other coil. As the electromagnetic inductive scheme, for example, a Qi scheme, a PMA scheme, and an NFC scheme have been well known.

Recently, a contactless communication medium compatible for both the magnetic resonance scheme and the electromagnetic inductive scheme has also been introduced.

A contactless type information card and IC using a magnetic resonance scheme is disclosed in the related art. In the contactless type information card and IC, a parallel resonance circuit is configured by a loop antenna, a condenser, and a variable capacitance element. When the contactless type information card and the loop antenna of a reader/writer of the IC are very close to each other, the power energy received by the contactless type information card and the loop antenna of the IC increases. In this case, a voltage applied to the variable capacitance element changes and a capacitance value of the variable capacitance element changes. Thus, the resonance frequency is shifted depending on the received voltage and the reception efficiency is lowered. As a result, the received voltage is prevented from being excessive.

A power reception device, a power transmission device, and a contactless power feeding system using a magnetic resonance scheme are disclosed in the related art. The power reception device is a circuit connected to a reception side resonance circuit including a power reception side coil and a power reception side capacitance, and includes a power reception circuit for generating an output electric power depending on electric power received by the power reception side coil using magnetic resonance. In addition, the power reception device includes a change/short circuit for changing a resonance frequency of the power reception side resonance circuit from a reference frequency or short-circuiting the power reception side coil before receiving electric power. In the related art, it is described that, in a state in which a foreign object is disposed on a power feeding stand, the foreign object is destroyed by a strong magnetic field generated by the power transmission side coil, and it is suggested that a terminal voltage of a coil of the foreign object on the power feeding stand increases, for example, from 100 to 200V. In some instances, the magnetic field strength generated in the power transmission side coil is, for example, about 45 to 60 A/m, and this magnitude is greater than a magnetic field strength of 7.5 A/m which is an upper limit value defined by the NFC standard. Further, in the related art, a circuit for changing a resonance frequency and a circuit for short-circuiting a reception side coil are disclosed respectively.

A semiconductor IC device and a contactless type IC card using a magnetic resonance scheme are disclosed in the related art. This semiconductor IC device includes a reception circuit for demodulating an information signal received via an antenna. The reception circuit includes an antenna terminal connected to the antenna and a rectifying circuit for rectifying and smoothing an AC signal applied to the antenna terminal. The contactless type IC card is equipped with a coil constituting the antenna, an input/output terminal provided on the surface of the IC card, and the IC device connected to the coil.

An electromagnetic inductive coupling device using an electromagnetic inductive scheme different from the magnetic resonance scheme is disclosed in the related art. The electromagnetic inductive coupling device disclosed in the related art includes an electromagnetically induced coil, a rectifying circuit for full-wave reflecting power energy taken through the coil, and a smoothing circuit for smoothing an output from the rectifying circuit to generate a predetermined internal power. In addition, the electromagnetic inductive coupling device includes a MOS transistor which is connected in parallel between both ends of the coil and operates in response to an output from the smoothing circuit.

An "extended specification" necessary for securing compatibility by reflecting the verification result of a contactless IC card that conforms to the ISO/IEC14443 is disclosed in the related art. The physical and electrical properties of a proximity IC card (PICC) and a proximity coupling device (PCD), and their antenna shapes, resonance frequencies, generated magnetic fields and the like are disclosed in the related art. For example, the resonance frequency of the PICC is proposed to be 13.56 MHz or more. In addition, "testing of PCD to be tested" is described and it is proposed that a reception voltage of a maximally generated magnetic field is 3V or less in an operating range of the PCD.

In a case where wireless power feeding is performed between the power feeder and the power receiver, a strong magnetic field is generated around the power feeder regardless of whether the magnetic resonance scheme or the electromagnetic inductive scheme is used. When the contactless communication medium approaches the power feeder and is exposed to the strong magnetic field, a high voltage is generated in the internal circuit of the contactless communication medium by the resonance circuit and the like within the contactless communication medium. Due to this high voltage, the internal circuit of the contactless communication medium may be damaged.

A technique of stopping power feeding when a medium, a foreign object or the like that does not respond to such wireless power feeding accidentally approaches the power feeder has been proposed. However, since it is also considered that the contactless communication medium approaches a power feeder that does not employ such a technique, it is desirable to install a voltage protection circuit in the contactless communication medium itself.

The contactless type information card and IC are limited to those that are supplied with electric power for driving the internal circuit by electromagnetic waves emitted from a communication destination device and perform data communication with the communication destination device in the related art. Thus, the scope to which the corresponding disclosure is applied is limited to the one in which the contactless type information card and IC and the communication destination device are systematically integrated. In other words, the overvoltage protection disclosed in the related art cannot be expected for general cards such as an RFID card, an NFC card, and the like.

In another related art, it is intended to control or stop the operation of the resonance circuit of the power reception side but does not consider a countermeasure such as damage prevention or the like in the information card itself. Thus, there is a possibility that the information card itself is deteriorated or enters a state in which it cannot withstand being used before the resonance circuit of the power reception side is stopped.

In another related art, it is intended to protect the reception side device, and protection of an information card is not disclosed. Thus, like the above-mentioned related art, there is a possibility that various kinds of information retained in the information card are deteriorated or enter a state in which they cannot withstand to be used before the power reception side device is protected.

In another related art, it is admitted to suggest that an AC power itself applied to the rectifying circuit is limited using the MOS transistor connected in parallel to the coil that receives an output from the smoothing circuit. However, since a specific size of an output of the smoothing circuit or a specific magnitude of a magnetic field is not disclosed, it cannot be expected for practical application.

The above-mentioned related arts are common in that they have means for attenuating sensitivity of a magnetic field when the magnetic field is strong. However, it is uncertain whether such means for attenuating sensitivity of the magnetic field is adapted to the magnetic field strength defined by the ISO/IEC14443. Thus, even though attenuation means operates, there is a possibility that an operating point of the attenuation means greatly exceeds the magnetic field defined by the ISO/IEC14443 or operates in magnetic field strength weaker than a predetermined magnetic field strength.

SUMMARY

The present disclosure provides some embodiments of a contactless communication medium providing a strong magnetic field countermeasure, regardless of magnetic field generated from an electronic device including at least one of a power transmission device and a power reception device. Further, the present disclosure provides some embodiments of a contactless communication medium adapted to a specific magnetic field strength defined by the ISO/IEC14443. In addition, the present disclosure provides some embodiments of a contactless communication medium capable of converting a predetermined magnetic field strength into a predetermined voltage. Further, the present disclosure provides some embodiments of an electronic device electromagetically coupled with a contactless communication medium to write or read information to or from the contactless communication medium through contactless communication or supply a driving current to a coil of the contactless communication medium.

The "contactless communication medium" of the present disclosure is one of radio frequency identification (RFID) in a broad sense. That is, the "contactless communication medium" mentioned herein is one of RF tags including ID information that allows information to be exchanged through communication of a short range (i.e., several centimeters to several meters) using a magnetic field or radio waves.

Further, the "contactless communication medium" mentioned herein is one of proximity IC cards (PICCs). Thus, any other contactless RF tags, as well as those that conform to an NFC scheme, a Qi scheme, an A4WP scheme and the ISO/IEC14443 standard, are included in the "contactless communication medium" mentioned herein.

In addition, the "contactless communication medium" mentioned herein includes at least a coil sensitive to power energy radiated from various electronic devices within an RFID. Further, the "contactless communication medium" mentioned herein includes a rectifying circuit for generating an electromagnetic force as power energy and a DC voltage proportional to a magnetic field strength, a smoothing circuit, a load impedance adjusting means, and the like. The rectifying circuit includes a diode element. The diode element includes a combination of a MOS transistor or a bipolar transistor and a diode element, as well as a PN junction diode using silicon and a Schottky barrier diode.

In addition, the "contactless communication medium" of the present disclosure includes a switch for attenuating sensitivity of a coil when power energy to which the coil is sensitive exceeds a predetermined strength.

According to one embodiment of the present disclosure, there is provided a contactless communication medium, including: a coil sensitive to a magnetic field; a rectifying circuit configured to rectify an alternating power energy generated in the coil; a smoothing circuit configured to smooth a rectified output outputted from the rectifying circuit to generate a DC voltage; an output terminal connected to the smoothing circuit; a voltage detecting circuit configured to compare an output voltage extracted from the output terminal with a reference voltage; a switch configured to operate in response to an output from the voltage detection circuit and to attenuate the alternating power energy generated in the coil when the output voltage reaches a predetermined value; and a load connected to the output terminal, wherein impedance of the load is adjusted such that the output voltage has a predetermined value when an effective value of the magnetic field applied to the coil is 12 A/m or more.

DETAILED DESCRIPTION

Embodiments of the present disclosure will now be described in detail with reference to the drawings.
(Overview of the Present Disclosure)

Figure 1:
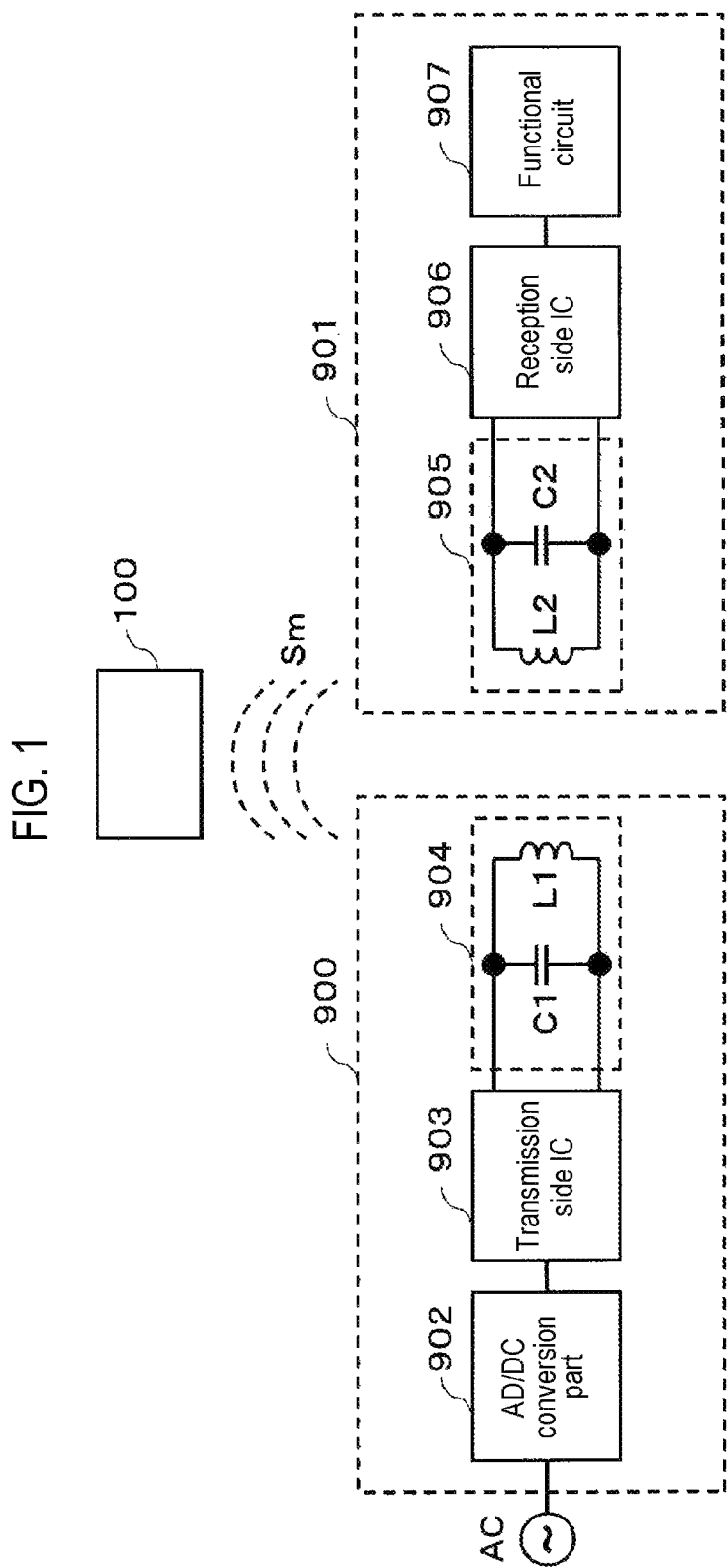
FIG. 1 is a schematic overview illustrating a state in which a contactless communication medium according to the present disclosure is exposed to a magnetic field radiated from a magnetic resonance type electronic device.

FIG. 1 is a schematic overview illustrating a state in which a contactless communication medium 100 according to the present disclosure is exposed to, for example, a magnetic field radiated from a magnetic resonance type electronic device.

The contactless communication medium 100, a wireless power feeder 900, and a wireless power receiver 901 of the present disclosure will be described with reference to the drawings. The wireless power feeder 900 and the wireless power receiver 901 are electronic devices in the present disclosure, but the contactless communication medium 100 handled in the present disclosure may or may not be appropriate for contactless communication with these electronic devices. When appropriate, the contactless communication medium 100 transmits and receives various information signals to and from these electronic devices. Various kinds of information may be, for example, an identification number, identification information, value information, credit information, or the like of a person. There are considerable cases where the contactless communication medium 100 does not transmit or receive various information signals to or from these electronic devices or other nearby electronic devices at all.

When the contactless communication medium 100 approaches the wireless power feeder 900 or is placed between the wireless power feeder 900 and the wireless power receiver 901, the contactless communication medium 100 may receive a strong magnetic field greater than an allowable level. Thus, it is considered that various kinds of information retained by the contactless communication medium 100 may be deteriorated or damaged. Since the contactless communication medium 100 includes less amount of, for example, an identification number, identification information, value information, credit information and the like of a person, it is necessary to protect various kinds of information retained by the contactless communication medium 100 from being deteriorated or damaged.

The wireless power feeder 900 includes, for example, an AC/DC conversion part 902, a power transmission side IC 903, and a power transmission side resonance circuit 904. The power transmission side resonance circuit 904 includes a capacitor C1 and a coil L1. The wireless power receiver 901 includes a power reception side resonance circuit 905, a power reception side IC 906, and a functional circuit 907. The power reception side resonance circuit 905 includes a capacitor C2 and a coil L2. The wireless power receiver 901 may be, for example, a mobile phone, a smartphone, a portable information terminal, a tablet personal computer, a digital camera, or the like.

The AC/DC conversion part 902 generates a DC voltage having a predetermined voltage from an AC voltage AC, and outputs the same. The power transmission side IC 903 operates depending on an output voltage from the AC/DC conversion part 902 to allow an AC current to flow through the power transmission side resonance circuit 904. Accordingly, the power transmission side resonance circuit 904 generates an alternating magnetic field adjusted by a predetermined resonance frequency in the coil L1.

When the alternating magnetic field is received from the wireless power feeder 900, the coil L2 of the power reception side resonance circuit 905 allows the AC current to flow through the power reception side IC 906. Thus, the power reception side IC 906 operates. The functional circuit 907 operates by the power reception side IC 906. The functional circuit 907 realizes a certain circuit function to be realized by the wireless power receiver 901.

As described above, when the wireless power feeder 900 and the wireless power receiver 901 are present within a predetermined range, the wireless power feeder 900 and the wireless power receiver 901 may perform communication, power transmission, power reception, and the like using magnetic resonance.

The power transmission and power reception between the wireless power feeder 900 and the wireless power receiver 901 employ a Qi scheme using a frequency of 100 to 200 KHz, an A4WP scheme using a frequency of 6.78 MHz, an NFC scheme using a frequency of 13.56 MHz, and the like. The transmission of electric power is performed between the wireless power feeder 900 and the wireless power receiver 901 through one of these schemes or any other scheme.

The contactless communication medium 100 to which the present disclosure is applied is not limited to various communication schemes including a coil, a rectifying circuit, a smoothing circuit, a voltage detecting circuit and the like, in terms of circuit configuration. However, for example, the contactless communication medium 100 may include the specification applied to each communication scheme defined by the ISO/IEC14443, such as the Qi scheme, the A4WP scheme and the NFC scheme. By making sure that the contactless communication medium 100 to which the present disclosure is applied corresponds to these schemes defined by an international standard or each consortium, the generality of the contactless communication medium 100 is extended. The contactless communication medium 100 according to the present disclosure can be prevented in advance from being deteriorated or damaged in all RFID communications with an unexpected magnetic field strength.

Further, a range of a magnetic field strength used in a proximity coupling device (PCD) is defined by the ISO/IEC14443 which is the international standard. The contactless communication medium 100 of the present disclosure corresponds to the PCD. In addition, the ISO/IEC14443 also describes six standards of coils (antennas) PICC1 to PICC6. A range of a magnetic field strength used in a proximity IC card (PICC) is also defined in each of the six standards of these coils (antennas) PICC1 to PICC6. For example, referring to three coils of PICC1, PICC3 and PICC6, effective values (rms) of magnetic field strength used in the contactless communication medium using each of the coils at a frequency of 13.56 MHz are defined as 7.5 A/m, 8.5 A/m and 18 A/m, respectively. Further, the contactless communication medium 100 is defined to withstand up to 8/5(=1.6) times the maximum magnetic field strength, although there is a restriction in time of 30 seconds, which is not a normal state. Therefore, for example, maximum magnetic field strengths which the contactless communication medium using three types of antennas (coils) of PICC1, PICC3 and PICC6 have to withstand are 12 A/m, 13.6 A/m, and 28.8 A/m, respectively. Thus, in the contactless communication medium 100 according to the present disclosure, a countermeasure is considered to prevent various kinds of information from being deteriorated or damaged when exposed to a magnetic field of 12 A/m or more, in view of a case where the PICC1 coil having the highest magnetic field sensitivity is employed. Further, "ISO" stands for "International Organization for Standardization" and is referred to as an international standardization organization. Further, "IEC" stands for "International Electrotechnical Commission" and is referred to as an international electrical standard conference. A standard jointly formulated by these two organizations is expressed as "ISO/IEC".

When the contactless communication medium 100 without a countermeasure for a strong magnetic field approaches the wireless power feeder 900 illustrated in FIG. 1, there is a possibility that various kinds of information retained by the contactless communication medium 100 may be deteriorated or damaged. Meanwhile, the contactless communication medium 100 of the present disclosure that has considered a countermeasure for a strong magnetic field may avoid such a possibility. Details thereof will be described hereinbelow.

(Block Circuit Diagram Illustrating a Concept of the Present Disclosure)

Figure 2:
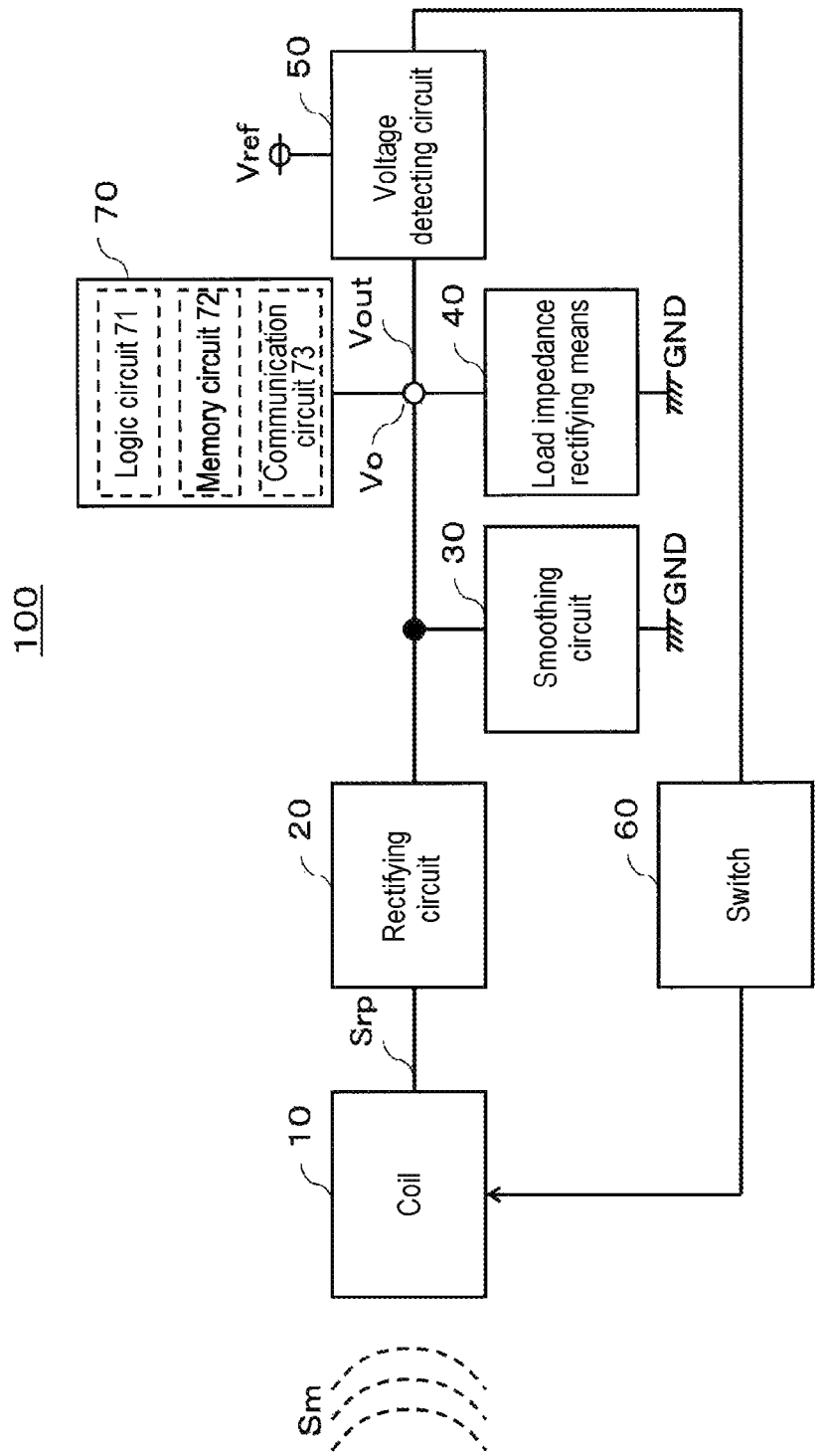
FIG. 2 is a block circuit diagram of a contactless communication medium according to a first embodiment of the present disclosure having a possibility of being exposed to the electronic device illustrated in FIG. 1.

FIG. 2 is a block circuit diagram of the contactless communication medium according to the present disclosure. Hereinafter, the block circuit diagram of the contactless communication medium 100 according to the present disclosure will be described with reference to the drawing. Further, the components having the same function are denoted by the same reference numerals and a repetitive description thereof will be omitted.

The contactless communication medium 100 according to the present disclosure of FIG. 2 includes a coil 10, a rectifying circuit 20, a smoothing circuit 30, a load impedance adjusting means 40, a voltage detecting circuit 50, a switch 60, and a functional circuit 70. The functional circuit 70 includes, for example, a logic circuit 71, a memory circuit 72, a communication circuit 73, and the like. The functional circuit 70 may also be provided when communication is performed with the wireless power feeder 900 or the wireless power receiver 901 illustrated in FIG. 1, when communication is performed with electronic devices (not shown) or even when communication is not performed with these electronic devices at all.

The coil 10 is installed to configure a magnetic resonance scheme and a magnetic inductive type, and is sensitive to a predetermined magnetic field strength. In the case of the magnetic resonance scheme, the coil 10 constitutes a parallel resonance circuit or a serial resonance circuit together with a capacitor to be described hereinbelow. In the case of the magnetic inductive type, a resonance circuit is not necessary but a coil corresponding to the coil 10 is necessary. Further, a resonance circuit may be installed in advance to be appropriate for both the magnetic resonance scheme and the magnetic inductive type.

The rectifying circuit 20 is used to convert an alternating electromagnetic force generated in the coil 10 into a DC voltage (output voltage Vout). As the rectifying circuit 20, a full-wave rectifying circuit and a half-wave rectifying circuit using diode elements are employed. As the diode elements, for example, PN junction diodes of silicon, Schottky barrier diodes, MOS transistors or the like are used. Their forward voltages are varied depending on a type of the diode element and a magnitude of the DC voltage output from the rectifying circuit 20 is also varied depending on the type of diode element.

The smoothing circuit 30 is used to convert an alternating magnetic field output from the rectifying circuit 20 into a DC voltage. The smoothing circuit 30 is configured by connecting a capacitor, a resistor, and a coil in parallel or in series. The smoothing circuit 30 is configured as a low pass filter (LPF) for removing a high frequency component and allowing a low frequency component to pass therethrough.

The load impedance adjusting means 40 is one of loads and is connected to an output terminal Vo and the smoothing circuit 30. The load impedance adjusting means 40 is connected in parallel or in series to the smoothing circuit 30. In FIG. 2, the load impedance adjusting means 40 is connected in parallel to the smoothing circuit 30. The load impedance adjusting means 40 may be considered as a part of the smoothing circuit 30, but the load impedance adjusting means 40 is distinguished from the smoothing circuit 30 because it is used to adjust a magnitude of the output voltage Vout output from the smoothing circuit 30. The load impedance adjusting means 40 also has a circuit function of a so-called discharge circuit for adjusting a discharge time constant of the smoothing circuit 30. The load impedance adjusting means 40 may include a variable resistor. The load impedance adjusting means 40 adjusts a variable resistance value and adjusts the output voltage Vout generated in the smoothing circuit 30. A resistance value set by the load impedance adjusting means 40 has a proportional relationship with the output voltage Vout. Thus, the output voltage Vout becomes small when the resistance value is small, and the output voltage Vout becomes large when the resistance value is large. Further, the output voltage Vout may be controlled by changing the type of a diode element constituting the rectifying circuit 20. The magnitude of the output voltage Vo is inversely proportional to the magnitude of the forward voltage. For example, if the output voltage Vout is too large due to the use of Schottky barrier diodes in the rectifying circuit 20, PN junction diodes may be used. However, since the forward voltage of the PN junction diodes or Schottky barrier diodes is uniquely determined, MOS transistors whose threshold voltage is adjustable when finely adjusting the output voltage Vout may be used.

The voltage detecting circuit 50 compares the output voltage Vout adjusted by at least one of the load impedance adjusting means and the smoothing circuit 30 with a reference voltage Vref. For example, the voltage detecting circuit 50 outputs a high level or low level voltage when the output voltage Vout reaches 3V. The voltage detecting circuit 50 is configured with a sole comparator or a window comparator with a plurality of comparators.

The switch 60 is used to receive the high level or low level voltage from the voltage detecting circuit 50 at a previous stage and interrupt a current flowing through the coil L2 or change its magnitude. For example, the switch 60 is configured with a single NMOS transistor, an NPN bipolar transistor, a serial circuit with these transistors and a resistor, or the like. Further, in order to operate the switch 60 at a relatively low voltage, a level shift circuit (not shown) may be installed between the voltage detecting circuit 50 and the switch 60.

The functional circuit 70 is one of the loads, and is embedded in the contactless communication medium 100 and operates using the output voltage Vout as a source voltage. The functional circuit 70 includes the logic circuit 71 for exchanging various kinds of information between the electronic devices including the wireless power feeder 900 and the wireless power receiver 901 illustrated in FIG. 1, the memory circuit 72 for storing various kinds of information, the communication circuit 73 for communicating with the electronic devices, and the like. The memory circuit 72 is configured with, for example, a non-volatile memory. A maximum rated source voltage permitted in the functional circuit 70 is, for example, 3V.

As described above, when the contactless communication medium 100 is exposed to a strong magnetic field, the smoothing circuit 30, the load impedance adjusting means 40, the voltage detecting circuit 50, and the switch 60 cooperate with one another to interrupt or attenuate an alternating voltage applied to the rectifying circuit 20. Thus, by protecting the output voltage Vout of the contactless communication medium 100 in which a strong magnetic field is applied to the coil 10 (L2) from being higher than a predetermined value, it is possible to protect various kinds of information retained by the contactless communication medium 100 from being deteriorated or damaged.

Figure 3:
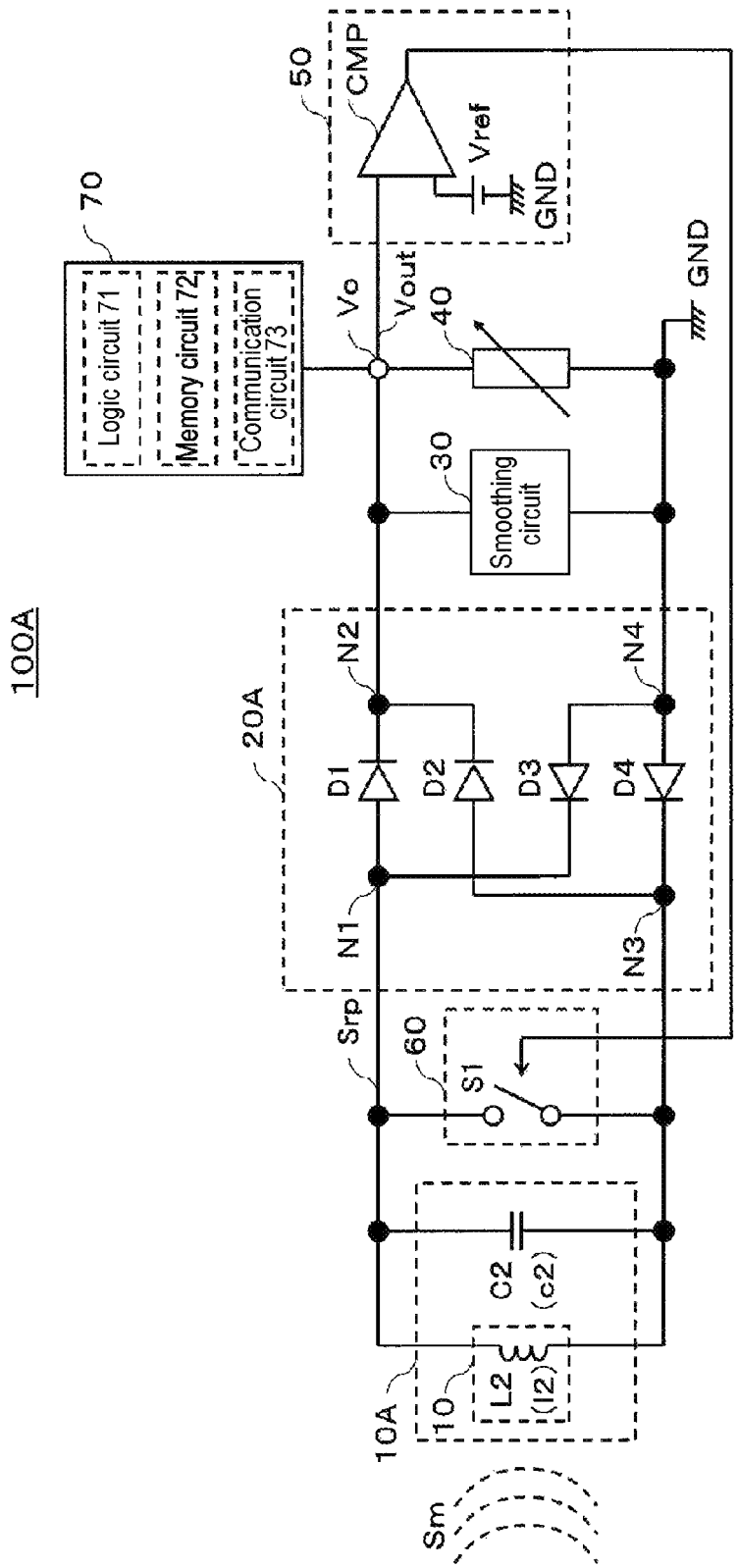
FIG. 3 is a circuit diagram appropriate for the block circuit diagram of FIG. 2, in which a control method of short-circuiting a resonance circuit is illustrated by using a contactless communication medium having a magnetic resonance type circuit configuration and using a PN junction diode in the rectifying circuit.

FIG. 3 is a specific circuit diagram illustrating an embodiment of the present disclosure appropriate for the block circuit diagram of FIG. 2. A contactless communication medium 100A includes a resonance circuit so as to be appropriate for a magnetic resonance type electronic device. PN junction diodes are used in a rectifying circuit 20A, and the resonance circuit is short-circuited in order to block an electromagnetic force generated in a coil. Hereinafter, a control method of the contactless communication medium 100A of FIG. 3 will be described.

The contactless communication medium 100A includes a coil 10, the rectifying circuit 20A, a smoothing circuit 30, a load impedance adjusting means 40, a voltage detecting circuit 50, a switch 60, and a functional circuit 70.

The coil 10 (L2) and the capacitor C2 are connected in parallel to constitute a resonance circuit 10A. The resonance circuit 10A is configured to be tuned to a frequency of an input magnetic field Sm received by the coil 10. A resonance frequency fr to be described hereinbelow is the same regardless of whether the coil 10 and the capacitor C2 are connected in parallel or connected in series, and is set depending on inductance l2 of the coil 10 (L2) and capacitance c2 of the capacitor C2. Thus, it doesn't matter if the coil 10 and the capacitor C2 are connected in series rather than connected in parallel. The resonance frequency fr is $1/(2\pi\sqrt{l2 \cdot c2})$ (fr=$1/(2\pi\sqrt{l2 \cdot c2})$). Specific numerical values of the resonance frequency fr, the inductance l2, and the capacitance c2 will be described hereinbelow.

The rectifying circuit 20A is used to convert an alternating electromagnetic force extracted from the resonance circuit 10A into a DC voltage. The rectifying circuit 20A is constituted by diode elements D1 to D4. An anode and a cathode of the diode element D1 are respectively connected to a node N1 and a node N2. An anode and a cathode of the diode element D2 are respectively connected to a node N3 and the node N2. An anode and a cathode of the diode element D3 are respectively connected to a node N4 and the node N1. An anode and a cathode of the diode element D4 are respectively connected to the node N4 and the node N3. The rectifying circuit constituted by the diodes D1 to D4 is referred to as a full-wave rectifier. Further, the rectifying circuit 20A may be constituted by, for example, a half-wave rectifier with two diodes rather than by four diodes of the diode elements D1 to D4. As the diode elements D1 to D4, for example, any one of PN junction diodes, Schottky barrier diodes, and MOS transistors is used.

The smoothing circuit 30 is used to smooth an AC voltage extracted from the node N2, which is an output from the rectifying circuit 20A, to a DC voltage. Specifically, the smoothing circuit 30 includes a capacitor or includes a capacitor and a resistor. In the present disclosure, the smoothing circuit 30 includes a capacitor having capacitance of 10 to 0.1 µF.

The load impedance adjusting means 40 is used to adjust the output voltage Vout generated at the node N2 and extracted from the output terminal Vo to a predetermined height. Here, the predetermined output voltage Vout is set at, for example, 3V described in the related art. The predetermined output voltage Vout is set based on a magnetic field strength within an allowable range of the contactless communication medium 100A using the coil L2. For example, the coil L2 is the coil PICC1 defined by the ISO/IEC14443, and when the contactless communication medium 100A is exposed to a strong magnetic field of 7.5 A/m (rms), the output voltage Vout is adjusted to be 3V by the load impedance adjusting means 40. Further, according to the ISO/IEC14443, although the contactless communication medium using the coil PICC1 is limited to 30 seconds in an average time as well as 7.5 A/m (rms) in a maximum magnetic field strength Hmax, it is required to withstand up to 8/5(=1.6) times the maximum magnetic field strength Hmax at a frequency of 13.56 MHz. Thus, the contactless communication medium using the coil PICC1 is required to withstand up to a magnetic field strength of 12 A/m which is 8/5(=1.6) times the magnetic field strength of 7.5 A/m. That is, the contactless communication medium using the coil PICC1 is required to withstand 7.5 A/m in a normal state and up to 12 A/m transitionally.

Similarly, referring to the coil PICC6, the contactless communication medium using the coil PICC6 is required to withstand 18 A/m (rms) which is the maximum magnetic field strength Hmax. Since the definition of 8/5(=1.6) times is also applied in this case, the contactless communication medium using the coil PICC6 is required to withstand 28.8 A/m which is a substantial maximum magnetic field strength. In view of this, when a magnetic field applied to the coil L2 exceeds 7.5 A/m, the output voltage Vout is adjusted to be 3V by the load impedance adjusting means 40 so that the contactless communication medium 100A according to the present disclosure may correspond to the coil PICC1 to the coil PICC6.

Further, the output voltage Vout may also be adjusted by selecting a type of the diode elements D1 to D4 constituting the rectifying circuit 20A. For example, when the diode elements D1 to D4 are configured with Schottky barrier diodes having a small forward voltage rather than with the PN junction diodes, the output voltage Vout becomes higher, such that the resistance of the load impedance adjusting means 40 is adjusted to a low level. In addition, when the diode elements D1 to D4 are configured with MOS transistors, a level of the output voltage Vout may be adjusted by controlling a threshold voltage of the MOS transistor.

Further, the load impedance adjusting means 40 may include only a resistor element. Further, the load impedance adjusting means 40 may include a combination of a resistor and a constant voltage element such as a diode or the like.

Further, the load impedance adjusting means 40 may include a combination of a resistor, a diode, and a transistor. As will be described hereinbelow, the functional circuit 70 may also be used as the load impedance adjusting means 40.

The voltage detecting circuit 50 detects a level of the output voltage Vout output at the output terminal Vo (node N2). The configuration of the voltage detecting circuit 50 may be the simplest when it is configured with only a comparator CMP1 stage, but another comparator (not shown) may also be provided to form a window comparator with the two comparators so that the output may be switched, for example, when the output voltage Vout is within a range of 2 to 3V. The voltage detecting circuit 50 outputs a voltage or a signal when the output voltage Vout is, for example, 3V. Further, the voltage detecting circuit 50 may monitor a source voltage Vout supplied to the functional circuit 70, and may also serve to suppress an overvoltage supplied to the functional circuit 70.

The switch 60 controls the resonance circuit 10A in response to an output from the voltage detecting circuit 50. The simplest control method is to stop a circuit operation of the resonance circuit 10A. However, another control method of lowering an alternating voltage Srp by shifting a resonance frequency of the resonance circuit 10A may also be used.

The functional circuit 70 operates by using the output voltage Vout generated at the node N3 as a source voltage. For example, the functional circuit 70 includes a logic circuit 71, a memory circuit 72, and a communication circuit 73. The communication circuit 73 performs communication with the wireless power feeder 900 illustrated in FIG. 1 or various electronic devices (not shown). Further, the functional circuit 70 may not necessarily have a communication function. In this case, the communication circuit 73 is not necessary.

Figure 4:
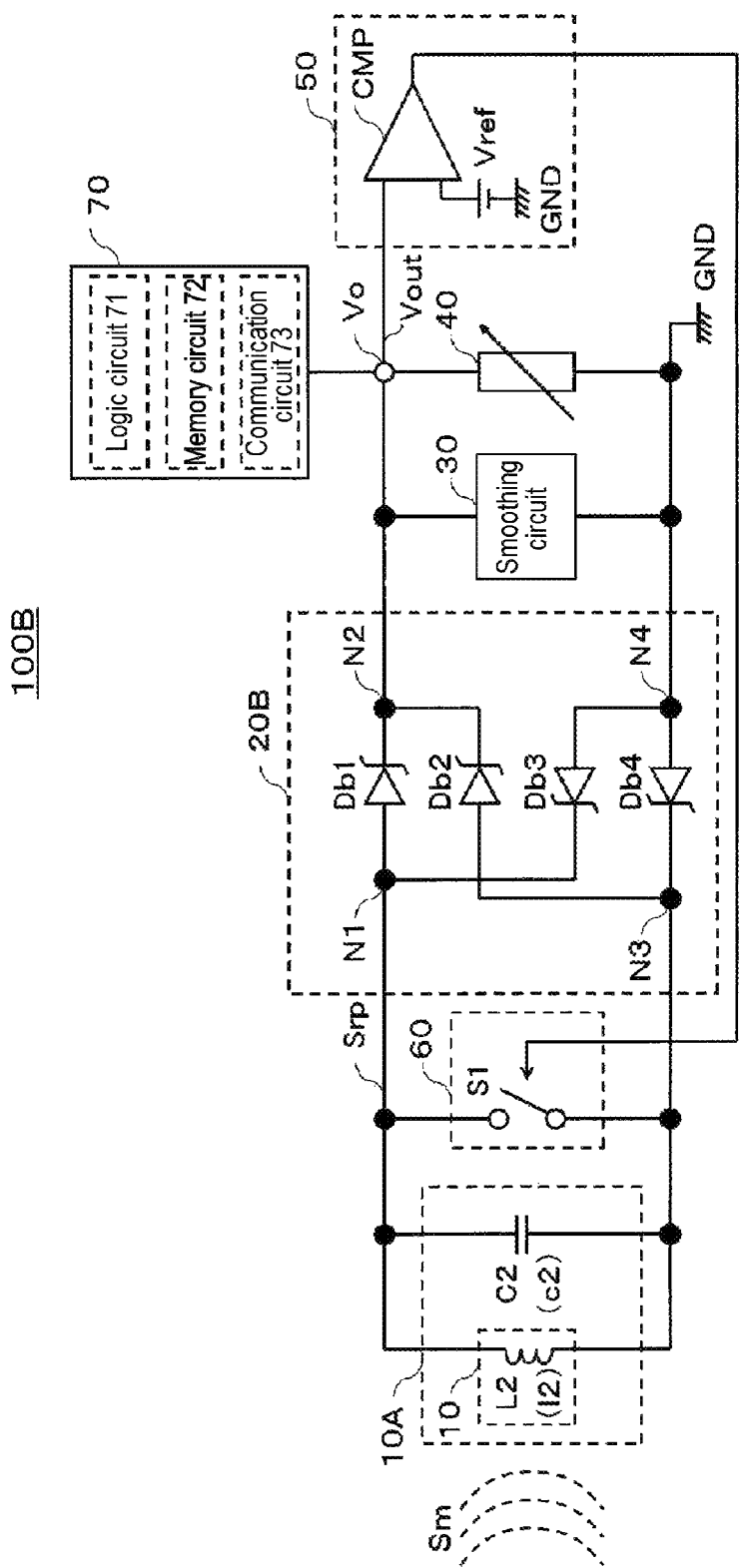
FIG. 4 illustrates another embodiment of FIG. 2, which is an example in which a Schottky barrier diode is used in the rectifying circuit.

FIG. 4 illustrates a contactless communication medium 100B. A rectifying circuit 20B of the contactless communication medium 100B is constituted by Schottky barrier diodes. This is different from the rectifying circuit 20A illustrated in FIG. 3 in that the PN junction diodes are used in the rectifying circuit 20A. The rectifying circuit 20B is constituted by Schottky barrier diodes Db1 to Db4, each of which has the same function as those of the diode elements D1 to D4 illustrated in FIG. 3. A forward voltage of the Schottky barrier diode is about 0.2 to 0.3V. Meanwhile, a forward voltage of the silicon PN junction diode is 0.6 to 0.7V. Therefore, the forward voltage of the Schottky barrier diode is lower than that of the silicon PN junction diode. An advantage of using the Schottky barrier diodes Db1 to Db4 is to obtain a high output voltage Vout because the forward voltage of the Schottky barrier diode is lower than that of the PN junction diode. In other words, when the alternating voltage Srp output from the coil 10 (coil L2) is the same, a higher output voltage Vout can be extracted from the output terminal Vo when using the Schottky barrier diodes Db1 to Db4 than using the PN junction diodes.

Figure 5:
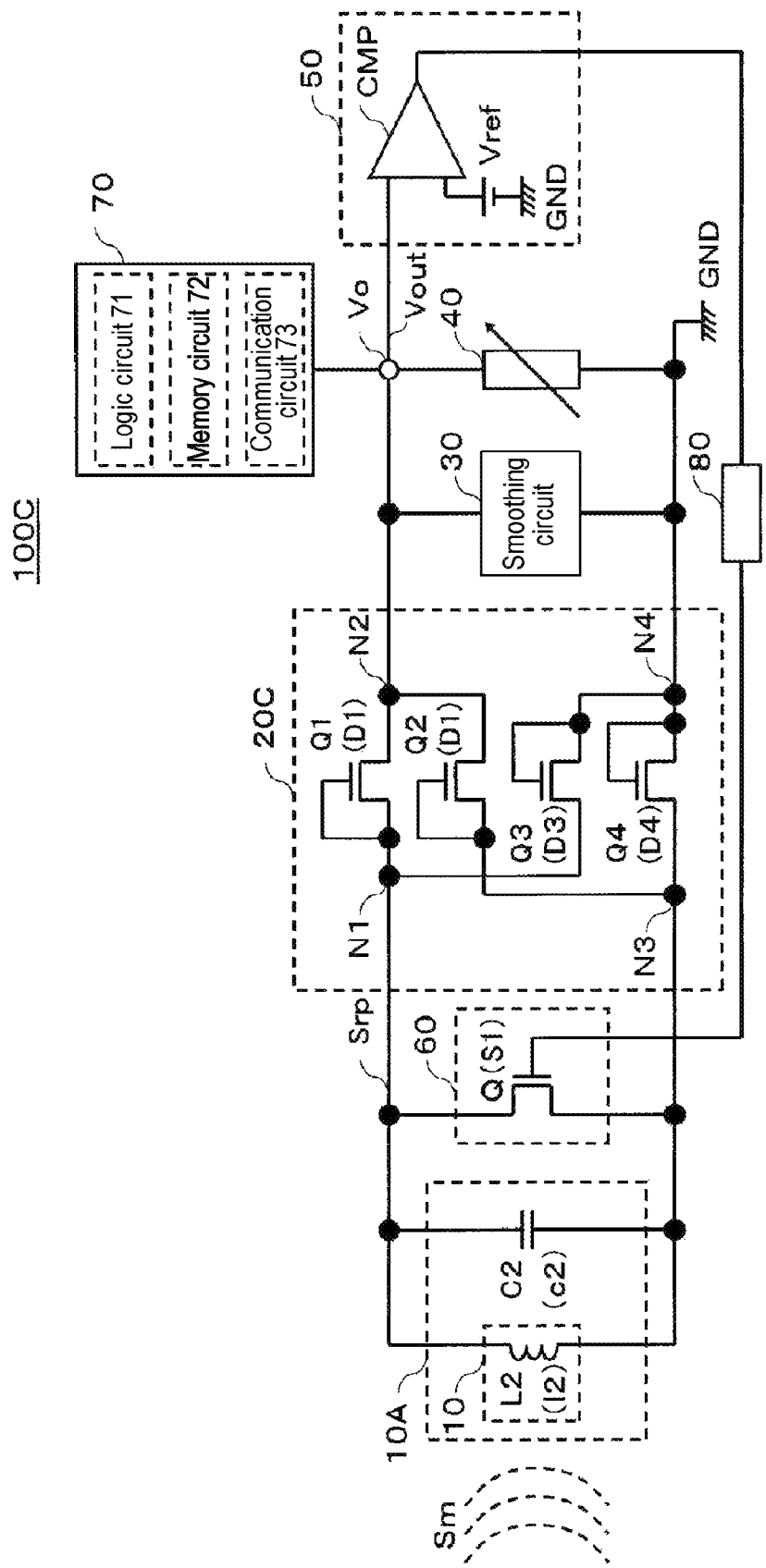
FIG. 5 illustrates another embodiment of FIG. 2, which is an example in which a MOS transistor is used in the rectifying circuit.

FIG. 5 illustrates a contactless communication medium 100C. The contactless communication medium 100C is different from the contactless communication medium 100A illustrated in FIG. 3 in the following two points. A first difference is that the rectifying circuit 20C is constituted with MOS transistors, while the diode elements D1 to D4 of the rectifying circuit 20A illustrated in FIG. 3 are configured with the silicon PN junction diodes. A second difference is that a MOS transistor Q is used as a switch 60. Further, the switch 60 is not limited to the MOS transistor but may be a bipolar transistor. The contactless communication medium 100C is the same as the contactless communication medium 100A illustrated in FIG. 3, except for the two differences. Thus, the rectifying circuit 20C will be described here.

The rectifying circuit 20C is constituted with MOS transistors Q1 to Q4, each of which has the same function as those of the diode elements D1 to D4 illustrated in FIG. 3. An advantage of using the MOS transistors Q1 to Q4 in the rectifying circuit 20C is that a threshold voltage is adjustable. The adjustment of the threshold voltage allows free adjustment of the forward voltage of the diode element. The MOS transistors Q1 to Q4 are respectively used as the diode elements D1 to D4. Since the threshold voltage of the MOS transistors Q1 to Q4 is used as the forward voltage of the diode element, a gate and a drain (or a source) of the MOS transistor are commonly connected, and a conductive path between the common connection node and the source (or the drain) is used as a diode element. The forward voltages of the silicon PN junction diode and the Schottky barrier diode are uniquely determined respectively, but the forward voltage of the MOS transistor can be freely set by adjusting the threshold voltage of the MOS transistor. That is, a conversion efficiency of converting the alternating voltage Srp into the output voltage Vout can be freely set by using the MOS transistors Q1 to Q4 in the rectifying circuit 20C. Further, the threshold voltage of the MOS transistor can be adjusted by adjusting an impurity concentration of a channel region, a thickness of an oxide film, a potential (substrate bias) of a substrate, or the like. In addition, when a gate voltage applied to a gate of the MOS transistor Q is adjusted by a level shift circuit 80 installed between the voltage detecting circuit 50 and the switch 60, an ON resistor interposed between a drain and a source of the MOS transistor Q can be controlled to have a predetermined magnitude.

Figure 6:
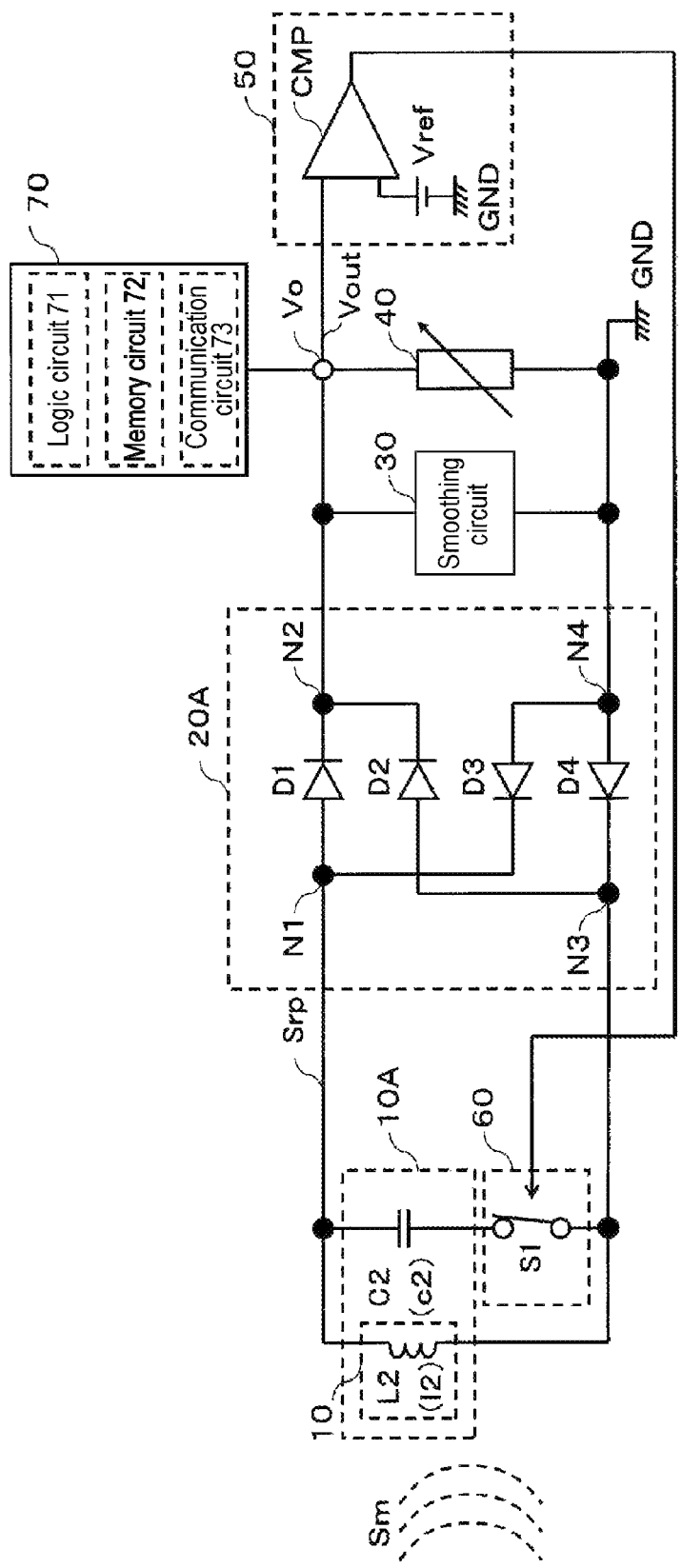
FIG. 6 illustrates another embodiment of FIG. 3, which is a circuit diagram illustrating another method of controlling the resonance circuit.

FIG. 6 illustrates a contactless communication medium 100D. A circuit connection between a resonance circuit 10A and a switch 60 of the contactless communication medium 100D is different from a circuit connection between the resonance circuit 10A and the switch 650 of the contactless communication medium 100A illustrated in FIG. 3. In FIG. 6, the coil L2 and the capacitor C2 are connected in parallel but the capacitor C2 and the switch 60 (S1) are connected in series. In general, the switch S1 is in a closed state (ON) and the resonance circuit 10A is formed by the coil L2 and the capacitor C2. When the switch S1 is opened (OFF) by an output from the voltage detecting circuit 50, the resonance circuit formed of the coil L2 and the capacitor C2 is not configured. Further, the switch 60 may be installed on the coil L2 side as well as on the capacitor C2 side. In addition, according to ON/OFF of the switch 60 in which a resistor (not shown) and the switch are installed, the resistor (not shown) may be connected in parallel or in series to the resonance circuit 10A. The switch 60 may be configured by connecting the switch S1 and the resistor in series. Further, even when the switch 60 is opened (OFF) in the contactless communication medium 100D illustrated in FIG. 6, the resonance circuit may be substantially formed if there exist a floating capacitance having a capacitance almost equal to that of the capacitor C2 and provided in parallel or in series with the coil L2. Thus, the values of the coil L2 and the capacitor C2 are selected in consideration of a magnitude of the floating capacitance of the coil L2 side. Further, in FIG. 6, the rectifying circuit 20, the smoothing circuit 30, the load impedance adjusting means 40, the voltage detecting circuit 50, and the functional circuit 70 are the same as those illustrated in FIG. 3, and thus, a description thereof will be omitted.

Figure 7:
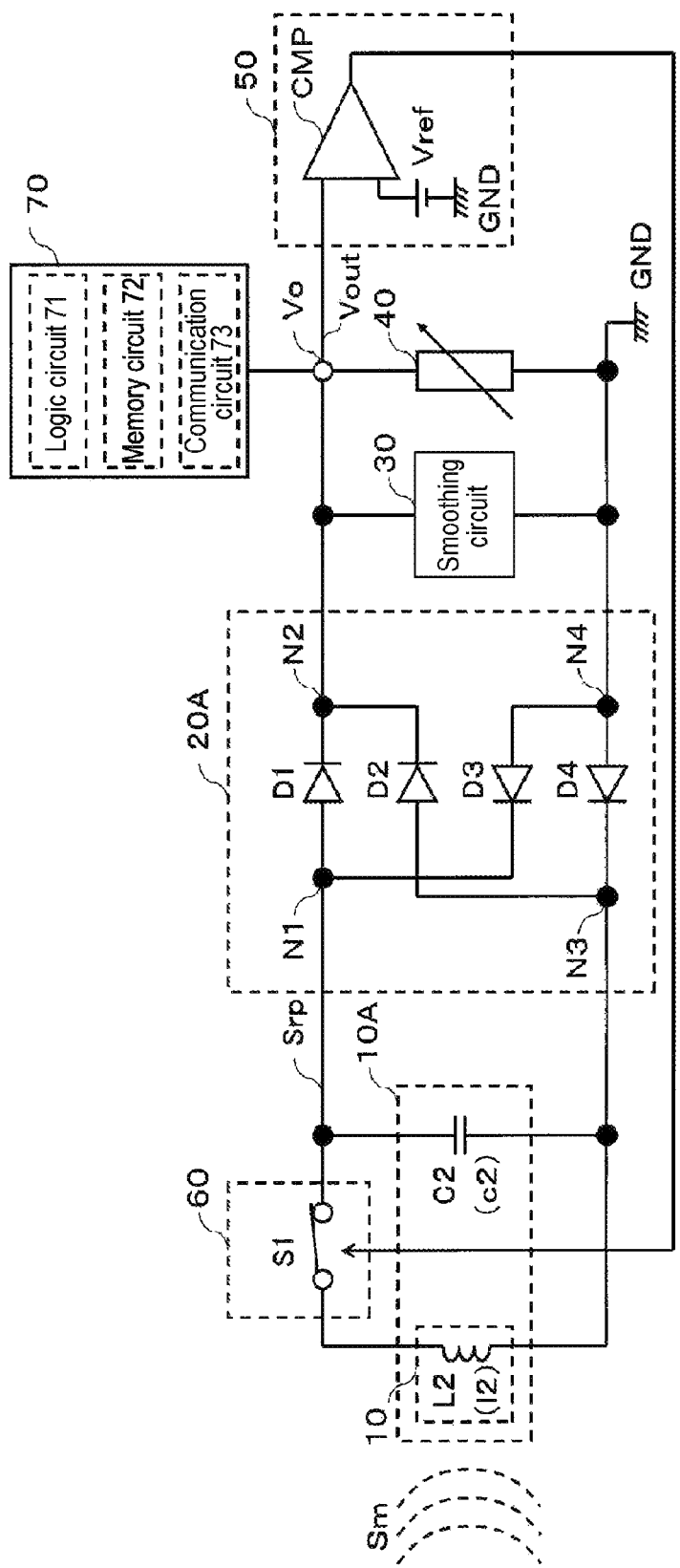
FIG. 7 is a circuit diagram illustrating a method of controlling a resonance circuit separate from FIG. 6.

FIG. 7 illustrates a contactless communication medium 100E. A circuit connection between the resonance circuit 10A and the switch 60 (S1) of the contactless communication medium 100E is different from the circuit connection between the resonance circuit 10A and the switch 60 (S1) of the contactless communication medium 100A illustrated in FIG. 3. Further, like FIG. 6, in FIG. 7, the circuit configuration of the resonance circuit 10A is changed by turning on and off the switch 60, but the connection of the switch 60 to the coil L2 side is different. The resonance circuit 10A includes the coil L2, the capacitor C2, and the switch 60. The coil L2 and the switch 60 are connected in series. The serial connection body and the capacitor C2 are connected in parallel. Since the switch 60 is in a closed state (ON) in a general operation, the resonance circuit 10A outputs an alternating voltage Srp according to resonant conditions. When the voltage detecting circuit 50 detects an output voltage Vout having a predetermined magnitude (e.g., 3V), the switch 60 is switched to an open state (OFF). At this time, since the circuit configuration of the resonance circuit 10A is different from that of an initial state of the resonance circuit, the alternating voltage Srp is 0 or attenuated. Even though floating capacitance is present in the connection body of the coil L2, the switch 60, and the capacitor C regardless of ON/OFF of the switch 60, the formation of an undesired parallel (serial) resonance circuit is prevented by connecting the serial connection body of the coil L2 and the switch 60 and the capacitor C2 in parallel. Thus, the contactless communication medium 100E of FIG. 7 can remove the defect that may occur in FIG. 6. Further, in FIG. 7, the rectifying circuit 20, the smoothing circuit 30, the load impedance adjusting means 40, the voltage detecting circuit 50, and the functional circuit 70 are the same as those illustrated in FIG. 3, and thus, a description thereof will be omitted.

Figure 8:
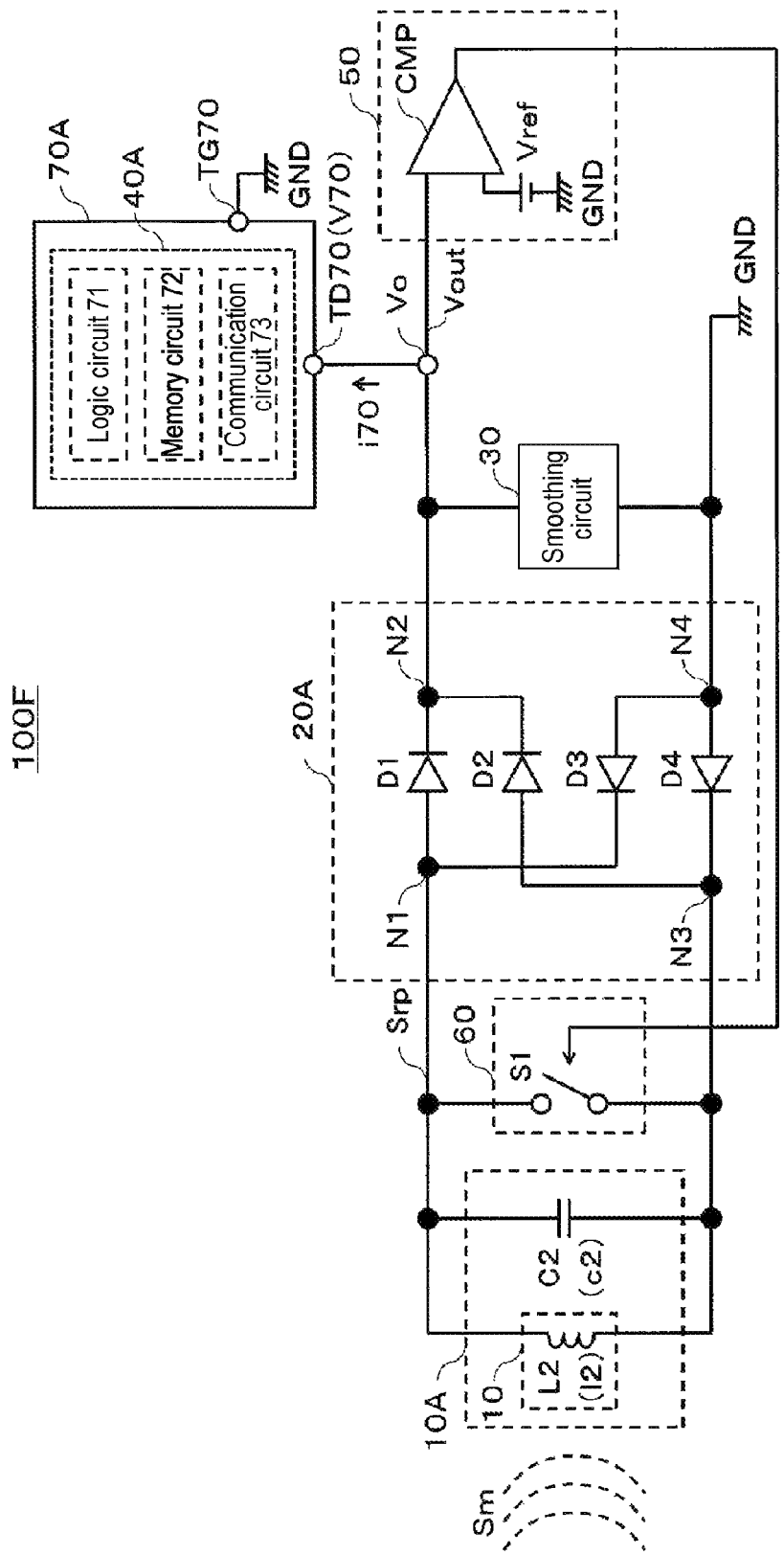
FIG. 8 is a circuit diagram illustrating another method of adjusting load impedance coupled to a subsequent stage of a smoothing circuit.

FIG. 8 illustrates a contactless communication medium 100F. The contactless communication medium 100F illustrated in FIG. 8 is different from the contactless communication medium 100A of FIG. 3, in that a functional circuit 70A also serves as a load impedance adjusting means 40A. The functional circuit 70A includes a logic circuit 71, a memory circuit 72, and a communication circuit 73. In some cases, the functional circuit 70A may also include another circuit part (not shown). The impedance adjusting means 40 illustrated in FIGS. 3 to 7 is connected between the output terminal Vo (node N2) and a ground potential GND (node N4). The functional circuit 70A illustrated in FIG. 8 is connected between the output terminal Vo and a ground terminal TG70. Thus, it is relatively easy for the functional circuit 70A to include the load impedance adjusting means. The functional circuit 70A may also be regarded as a resistive impedance, but a magnitude of the impedance is dependent upon a load current i70 flowing through the functional circuit 70A. Thus, the inclusion of the load impedance adjusting means 40A in the functional circuit 70A is restricted in a manner different from that of the circuit configuration illustrated in FIGS. 3 to 7.

When the load current flowing through the functional circuit 70A is i70 and a source voltage applied to the terminal TD70 as a power supply terminal of the functional circuit 70A is V70, resistive impedance Z70 between the power supply terminal TD70 of the functional circuit 70A and the ground potential GND is V70/i70 (Z70=V70/i70). Since the source voltage V70 is equal to the output voltage Vout, Z70=Vout/i70. For example, when Vout=3V and current i70=30 mA, the resistive impedance Z70=3,000/30=100Ω. In other words, in the contactless communication medium 100F of FIG. 8, the same effect as that of FIGS. 3 to 7 can be obtained within a range in which the load current i70 flowing through the functional circuit 70A is freely adjustable.

Figure 9:
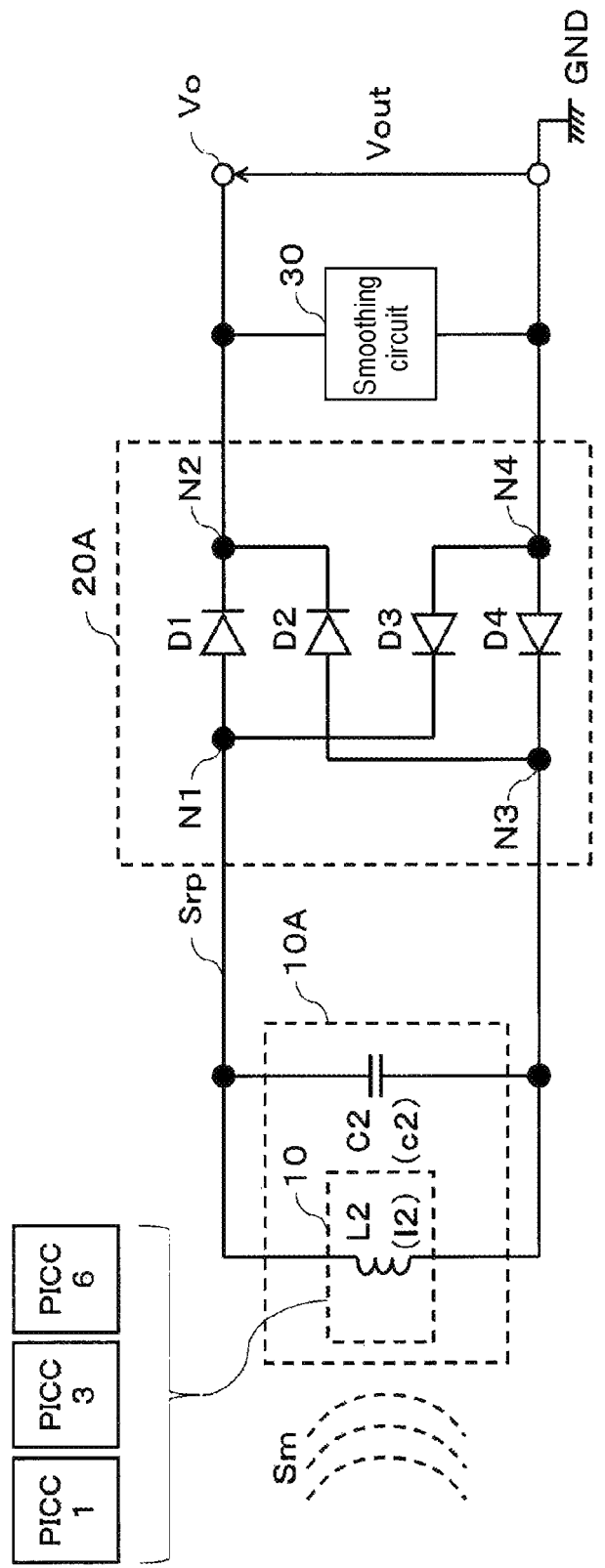
FIG. 9 is an experimental circuit diagram for obtaining a correlation between a magnetic field strength received by a contactless communication medium and an output voltage as an output of a rectifying circuit.

FIG. 9 is a measurement circuit in which the antennas PICC1, PICC3, and PICC6 defined by the ISO/IEC14443 are used, and which is used to obtain input/output characteristics between an applied magnetic field strength and an output voltage Vo output from the rectifying circuit. The measurement circuit employs most of the circuit parts constituting the contactless communication medium 100A illustrated in FIG. 3. The coil L2 is configured to be sensitive when exposed to an input magnetic field Sm. The coil L2 is illustrated as a substitute of three coils PICC1, PICC3, and PICC6. The input magnetic field Sm having an existing magnetic field strength is applied to the coil L2 (PICC1, PICC3, and PICC6). Further, in the measurement circuit, the capacitor C2 is installed. The resonance circuit 10A is configured by the coil L2 and the capacitor C2. The resonance circuit 10A illustrated in FIG. 9 is a parallel resonance circuit, but it may also be configured as a serial resonance circuit. A resonance frequency when the coil L2 and the capacitor C2 are resonated is expressed by the same formula regardless of whether the parallel resonance circuit or the serial resonance circuit is used. The resonance frequency used in measurement of the present disclosure is 13.56 MHz that conforms to the ISO/IEC14443. Further, the capacitance of the capacitor C2 used in the measurement of the present disclosure is 10 to 0.1 μF.

As the capacitor C2, a capacitor whose capacitance is adjustable is used. A variable range is, for example, 3 to 170 μF. The variable range is changed depending on magnitudes of inductances of the antennas PICC1, PICC3, and PICC6.

In the rectifying circuit 20A, a full-wave rectifying circuit constituted by four silicon PN junction diodes is used. Further, instead of the PN junction diodes, for example, Schottky barrier diodes may also be used. In addition, referring to PICC-S/M/L, which is a reference for testing power transmission disclosed in the related art, the Schottky barrier diodes are employed in the measurement circuit.

The smoothing circuit 30 converts an alternating voltage output from the rectifying circuit 20A into a DC voltage. The smoothing circuit 30 is configured by a combination of a capacitor, a coil, and a resistor.

As the load impedance adjusting means 40, a variable resistor appropriate for fine adjustment to adjust the DC voltage output from the smoothing circuit 30 to a predetermined level is used. A variable range of the variable resistor is, for example, 30 to 500Ω. Further, in the measurement of the present disclosure, the load impedance adjusting means 40 is configured solely by a variable resistor that is adjustable in units of 0.01Ω, but two or three fixed resistors and a variable resistor may be connected in parallel or in series to perform the fine adjustment. In addition, finally, the fixed resistor included in the adjusted resistance in the load impedance adjusting means 40 may be connected instead of the load impedance adjusting means 40.

The output terminal Vo is used to extract an output voltage Vout adjusted by the load impedance adjusting means 40. The output voltage Vout is measured based on the ground potential GND. The output voltage Vout has a predetermined level, for example, 3V by adjustment of the variable resistor constituting the load impedance adjusting means 40. A measurement result by the measurement circuit using FIG. 9 will be described hereinbelow.

Figure 10:
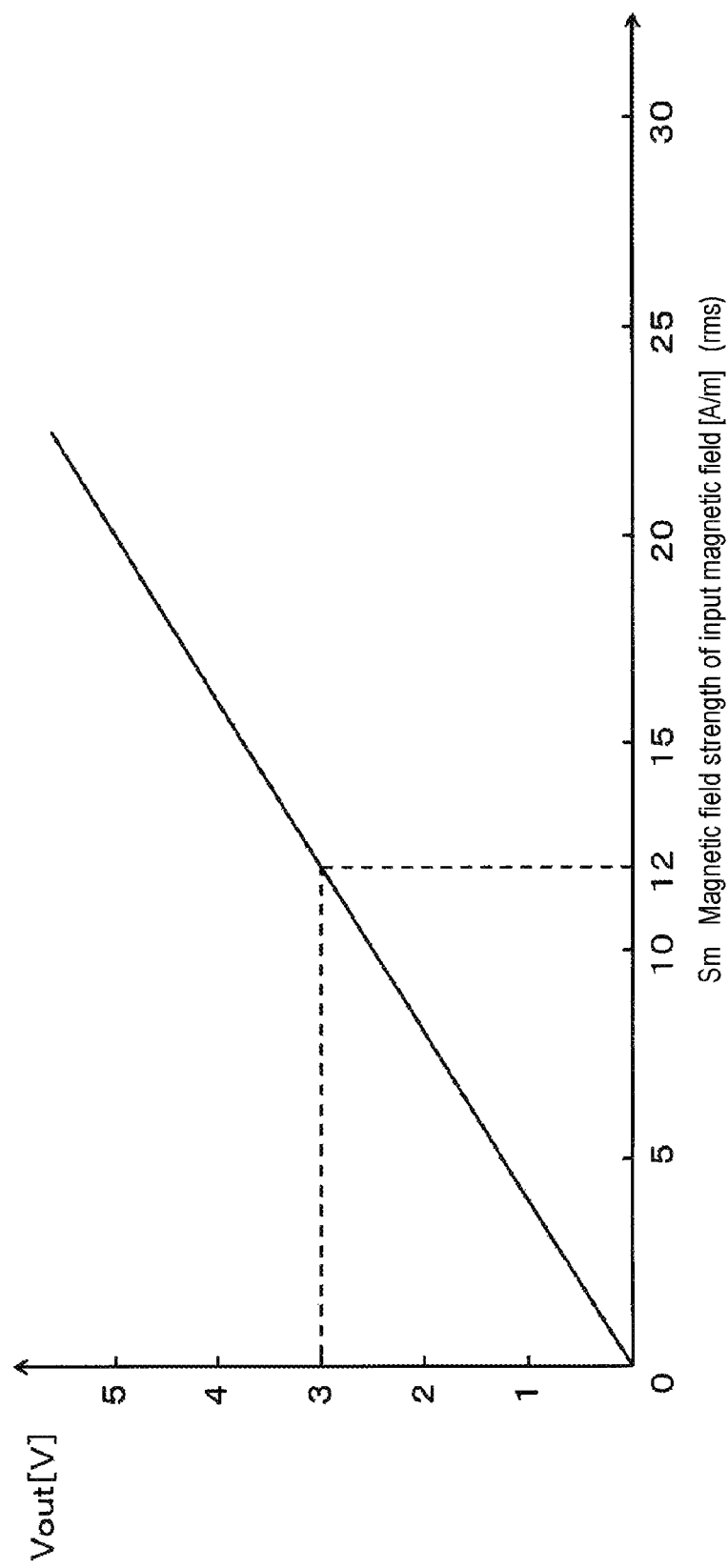
FIG. 10 is a characteristic diagram of measuring a relationship between a magnetic field strength supplied to a coil L2 and an output voltage Vout output from a smoothing circuit when a coil PICC1 defined by the ISO/IEC14443 is used in the coil L2 in the first embodiment of the present disclosure illustrated in FIG. 3.

FIG. 10 illustrates input/output characteristics between a magnetic field strength of an input magnetic field Sm applied to the coil L2 and an output voltage Vout when the coil PICC1 is employed as the coil L2, based on the measurement circuit illustrated in FIG. 9. In FIG. 10, the horizontal axis represents a magnetic field strength of the input magnetic field Sm by an effective value (rms) and the vertical axis represents the output voltage Vout (V). The output voltage Vout is proportional to a magnetic field strength by which the coil L2 is exposed. In FIG. 10, a resistance value of the load impedance adjusting means 40 is adjusted such that the output voltage Vout is 3V when the magnetic field strength is 12 A/m (rms), and a measurement result of the resistance value was about 49Ω. An input/output between the input magnetic field Sm and the output voltage Vout is represented by almost a straight line. The contactless communication medium using the coil PICC1 defined by the ISO/IEC14443 is required to withstand a magnetic field strength of 7.5 A/m, and in spite of temporal restrictions, it is required to withstand up to 12 A/m which is 8/5(=1.6) times 7.5 A/m. Further, in the related art, "testing of PCD to be tested" is disclosed and it is proposed that a reception voltage of a maximally generated magnetic field is 3V or less in an operating range of the PCD. Therefore, the resistance value of the load impedance adjusting means 40 is adjusted such that the output voltage Vout is 3V when the magnetic field strength is 12 A/m (rms). Thus, in the contactless communication medium of the present disclosure, when the output voltage Vout reaches 3V, the circuit operation of the resonance circuit 10A is stopped or the resonance frequency of the resonance circuit 10A is shifted to control the output voltage Vout so as not to exceed 3V. Further, regarding controlling the output voltage Vout to be 3V, it is also considered that the level of the source voltage allowable by the functional circuit 70 described above is, for example, 3.3V. In addition, when the magnetic field strength is 12 A/m, the output voltage Vout is adjusted to be 3V, but the output voltage Vout may also be adjusted to be 3V when the magnetic field strength is 7.5 A/m. When the load impedance adjusting means 40 operates at a low magnetic field strength, it is possible to further enhance the reliability of protecting it from a strong magnetic field.

Figure 11:
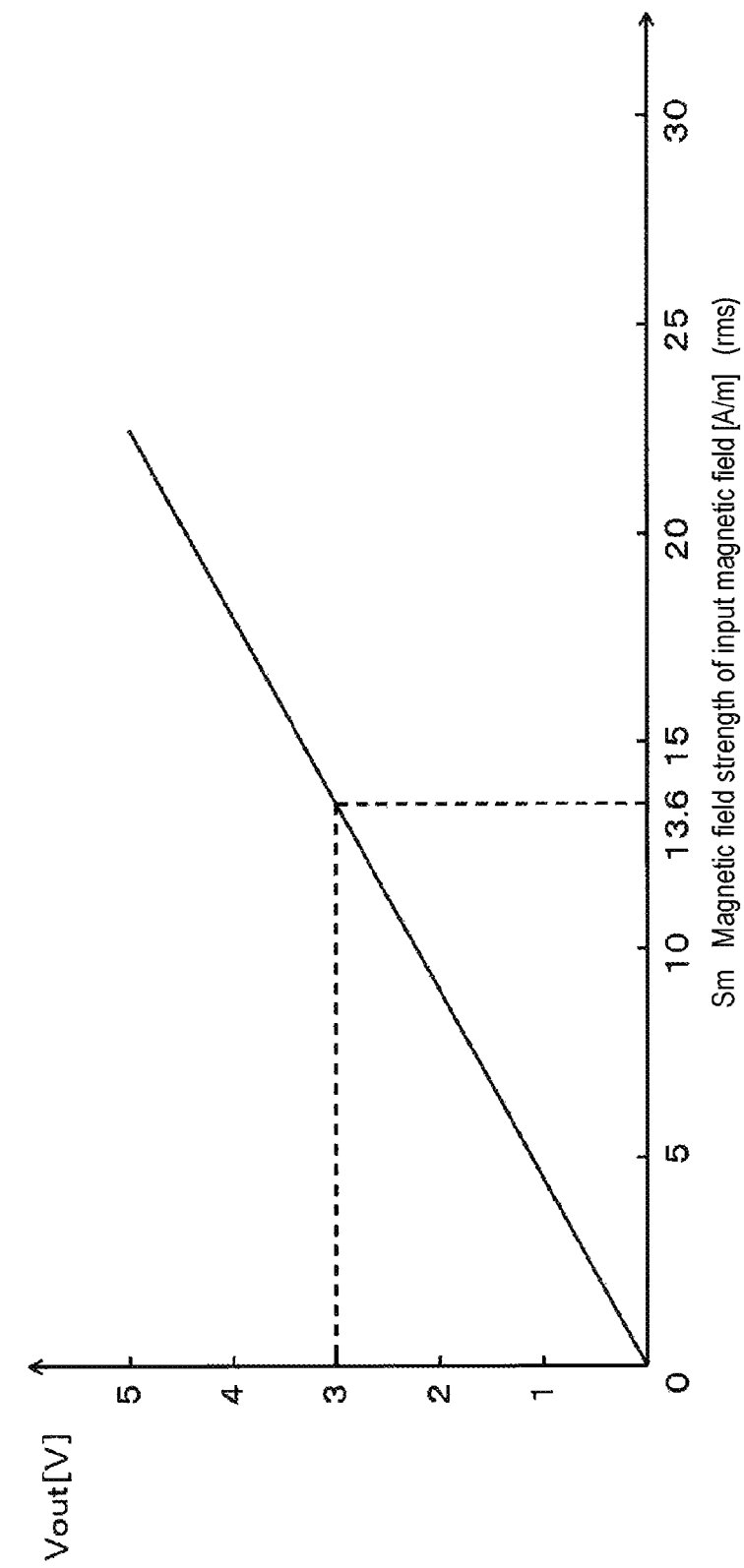
FIG. 11 is a characteristic diagram of measuring a relationship between a magnetic field strength supplied to a coil L2 and an output voltage Vout output from a smoothing circuit when a coil PICC3 defined by the ISO/IEC14443 is used in the coil L2 in the first embodiment of the present disclosure illustrated in FIG. 3.

FIG. 11 illustrates input/output characteristics between a magnetic field strength of an input magnetic field Sm applied to the coil L2 and an output voltage Vout when the coil PICC3 is employed as the coil L2, based on the measurement circuit illustrated in FIG. 9. In FIG. 11, the horizontal axis represents a magnetic field strength of the input magnetic field Sm by an effective value (rms) and the vertical axis represents the output voltage Vout (V). The output voltage Vout is proportional to a magnetic field strength by which the coil L2 is exposed. In FIG. 11, a resistance value of the load impedance adjusting means 40 is adjusted such that the output voltage Vout is 3V when a magnetic field strength is 13.6 A/m (rms), and a measurement result of the resistance value was about 71Ω. An input/output between the input magnetic field Sm and the output voltage Vout is represented by almost a straight line. The contactless communication medium using the coil PICC1 defined by the ISO/IEC14443 is required to withstand a magnetic field strength of 8.5 A/m, and in spite of temporal restrictions, it is required to withstand up to 13.6 A/m which is 8/5(=1.6) times 8.5 A/m. Further, in the related art, "testing of PCD to be tested" is disclosed and it is proposed that a reception voltage of a maximally generated magnetic field is 3V or less in an operating range of the PCD. Therefore, the resistance value of the load impedance adjusting means 40 is adjusted such that the output voltage Vout is 3V when the magnetic field strength is 13.6 A/m (rms). Thus, in the contactless communication medium of the present disclosure, when the output voltage Vout reaches 3V, the circuit operation of the resonance circuit 10A is stopped or the resonance frequency of the resonance circuit 10A is shifted to control the output voltage Vout so as not to exceed 3V. Further, regarding controlling the output voltage Vout to be 3V, it is also considered that the level of the source voltage allowable by the functional circuit 70 described above is, for example, 3.3V. In addition, when the magnetic field strength is 13.6 A/m, the output voltage Vout is adjusted to be 3V, but the output voltage Vout may also be adjusted to be 3V when the magnetic field strength is 8.5 A/m. When the load impedance adjusting means 40 operates at a low magnetic field strength, it is possible to further enhance the reliability of protecting it from a strong magnetic field.

Figure 12:
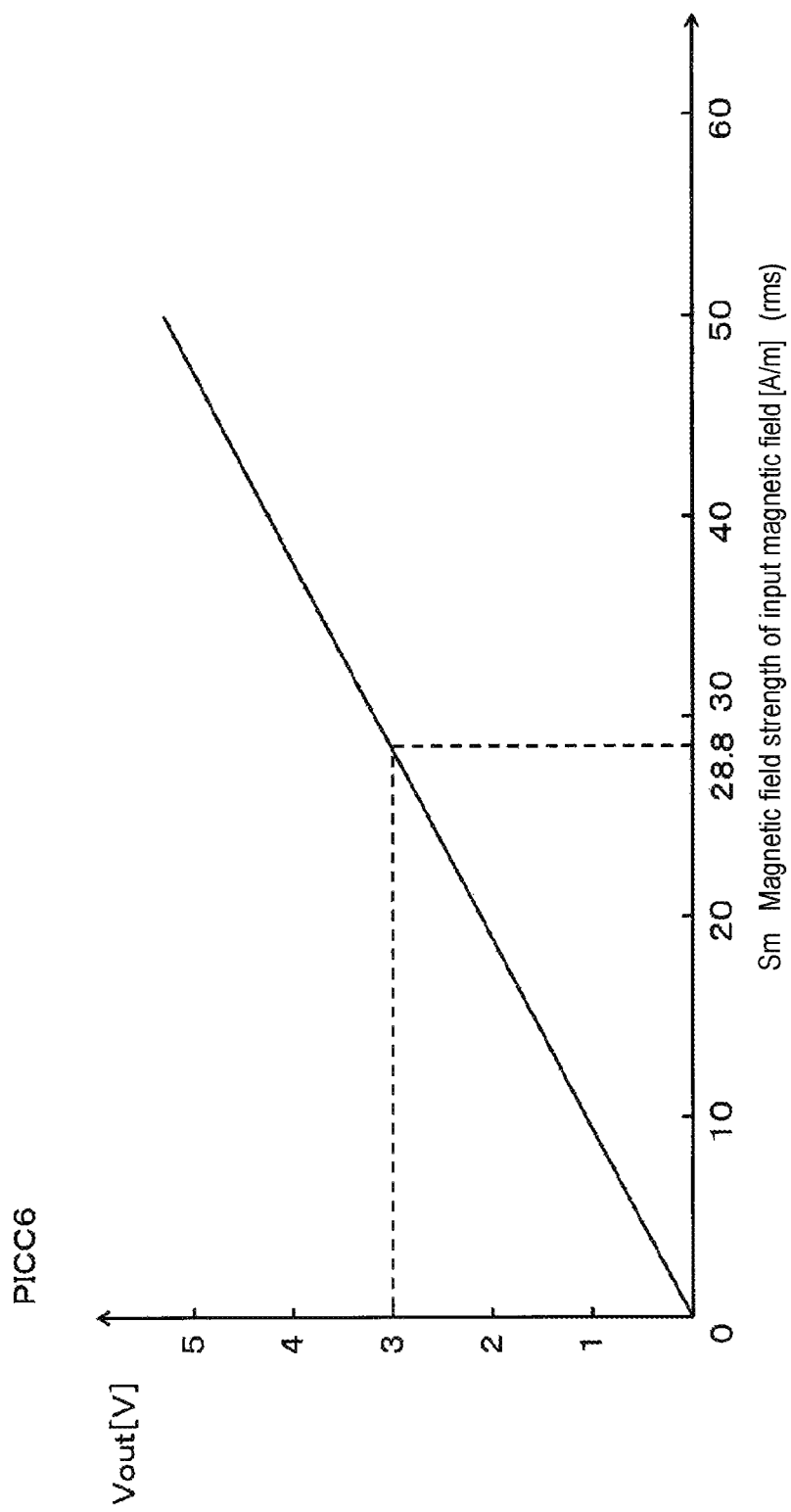
FIG. 12 is a characteristic diagram of measuring a relationship between a magnetic field strength supplied to a coil L2 and an output voltage Vout output from a smoothing circuit when a coil PICC6 defined by the ISO/IEC14443 is used in the coil L2 in the first embodiment of the present disclosure illustrated in FIG. 3.

FIG. 12 illustrates input/output characteristics between a magnetic field strength of an input magnetic field Sm applied to the coil L2 and an output voltage Vout when the coil PICC6 is employed as the coil L2, based on the measurement circuit illustrated in FIG. 9. As described above, the coil PICC6 is required to withstand the strongest magnetic field strength. In FIG. 12, the horizontal axis represents a magnetic field strength of the input field Sm by an effective value (rms) and the vertical axis represents the output voltage Vout (V). The output voltage Vout is proportional to a magnetic field strength by which the coil L2 is exposed. In FIG. 12, a resistance value of the load impedance adjusting means 40 is adjusted such that the output voltage Vout is 3V when a magnetic field strength is 28.8 A/m (rms), and a measurement result of the resistance value was about 71Ω. An input/output between the input magnetic field Sm and the output voltage Vout is represented by almost a straight line. The contactless communication medium using the coil PICC6 defined by the ISO/IEC14443 is required to withstand a magnetic field strength of 18 A/m, and in spite of temporal restrictions, it is required to withstand up to 28.8 A/m which is 8/5(=1.6) times 18 A/m. Further, in the related art, "testing of PCD to be tested" is disclosed and it is proposed that a reception voltage of a maximally generated magnetic field is 3V or less in an operating range of the PCD. Therefore, the resistance value of the load impedance adjusting means 40 is adjusted such that the output voltage Vout is 3V when the magnetic field strength is 18 A/m (rms). Thus, in the contactless communication medium of the present disclosure, when the output voltage Vout reaches 3V, the circuit operation of the resonance circuit 10A is stopped or the resonance frequency of the resonance circuit 10A is shifted to control the output voltage Vout so as not to exceed 3V. In addition, when the magnetic field strength is 28.8 A/m, the output voltage Vout is adjusted to be 3V, but when the magnetic field strength is 18 A/m, the output voltage Vout may also be adjusted to be 3V. When the load impedance adjusting means 40 operates at a low magnetic field strength, it is possible to further enhance the reliability of protecting it from a strong magnetic field.

As described above, the resistance values of the load impedance adjusting means 40 appropriate for the coils PICC1, PICC3, and PICC6 illustrated in FIGS. 10 to 12 were experimentally obtained as 49 Ω, 71Ω, and 71Ω, respectively. However, these values are varied depending on inductance or resistance components of the PICC1, PICC3, and PICC6, a circuit configuration of the rectifying circuit 20A, a circuit configuration of the smoothing circuit 30, and the like. Experiments of many combinations are necessary to experimentally obtain a predetermined output voltage (e.g., 3V) at a predetermined input magnetic field strength (e.g., 7.5 A/m), but the present inventor supposes that it is sufficient to adjust the resistance value of the load impedance adjusting means 40 such that the load impedance seen from the output terminal Vo may be adjusted to fall within a range of 30 to 500Ω.

One of the features of the contactless communication medium according to the present disclosure is that it is appropriate for the antenna coil PICC6 required to withstand a highest magnetic field strength among the six antenna coils PICC1 to PICC6 defined by the ISO/IEC14443. In other words, it is predicted that there is a possibility that the contactless communication medium is exposed to a magnetic field strength of 28.8 A/m or more in the near future. Here, the contactless communication medium of the present disclosure considers a countermeasure for a strong magnetic field such that various kinds of information is not deteriorated or damaged even near an electronic device appropriate for the antenna coil of the PICC6.

Figure 13:
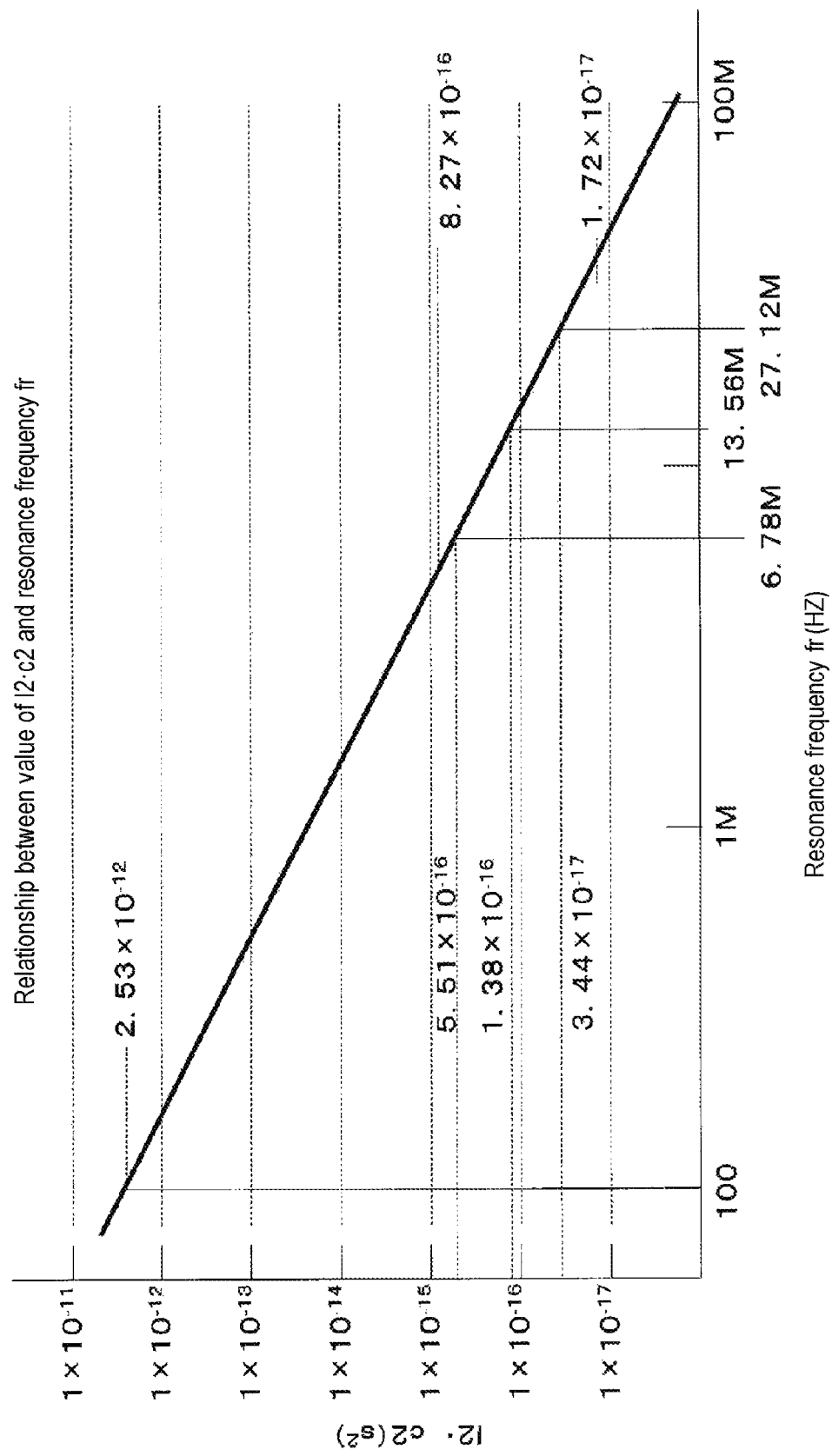
FIG. 13 is a calculation characteristic diagram of obtaining a resonance frequency in a resonance circuit configured by a coil L2 (inductance l2) and a capacitor C2 (capacitance c2) in the magnetic resonance type contactless communication medium illustrated in FIG. 3.

FIG. 13 illustrates a magnitude of a product l2·c2 of inductance l2 of the coil L2 and capacitance c2 of the capacitor C2 to be used to set a resonance frequency fr at a predetermined magnitude. In FIGS. 10 and 11 described above, the resonance frequency fr was described as 13.56 MHz (fr=13.56 MHz). However, the resonance frequency is also considered as 6.78 MHz, as well as 13.56 MHz. Further, 27.12 MHz, which is two times 13.56 MHz, is also supposed in the future. In addition, there may also be a case where the resonance frequency is set at 100 KHz. Here, in the present disclosure, it is proposed to calculate and prepare a value of l2·c2 as the product of the inductance l2 of the coil L2 and the capacitance c2 of the capacitor C2 in advance to correspond to the resonance frequency fr over a wide range. Such a preparation is considered to be useful to obtain various characteristics in designing, measuring, and experimenting the resonance circuit.

In FIG. 13, the horizontal axis represents the resonance frequency fr. The vertical axis represents the product l2·c2 of the inductance l2 of the coil L2 and the capacitance c2 of the capacitor C2. In the resonance circuit 10A illustrated in FIG. 3, the resonance frequency fr is $fr=1/(2\pi\sqrt{(l2 \cdot c2)})$. It is cumbersome to obtain a value of $2\pi$ or a value of $\sqrt{(l2 \cdot c2)}$ to obtain the resonance frequency fr. Thus, FIG. 13 shows that $2\pi$ or $\sqrt{\text{(root)}}$ is calculated and prepared in advance. The value of (l2·c2) may be easily obtained by modifying a formula of obtaining the resonance frequency fr, i.e., $fr=1/(2\pi\sqrt{(l2 \cdot c2)})$. Thus, $l2 \cdot c2 = 1/(4\pi^2 fr^2)$, and specifically, $l2 \cdot c2 = 0.02533/fr^2$ is obtained. Some frequencies are substituted to this formula as follows. For example, when the resonance frequency fr is set at fr=13.56 MHz, the value of (l2·c2) is $1.38 \times 10^{-16}$ ($s^2$). Further, when the resonance frequency fr is set at fr=6.78 MHz, the value of (l2·c2) is $5.51 \times 10^{-16}$ ($s^2$). In addition, when the resonance frequency fr is set at fr=27.12 MHz, the value of (l2·c2) is $3.44 \times 10^{-17}$ ($s^2$). Thus, for example, the value of l2·c2 satisfying the resonance conditions of the resonance frequency of 27.12 to 6.78 MHz is within a range of $3.44 \times 10^{-17}$ ($s^2$) to $5.51 \times 10^{-16}$ ($s^2$). For example, when 50% of margin is taken in this range, a range of $1.72 \times 10^{-17}$ ($s^2$) to $8.27 \times 10^{-16}$ ($s^2$) is obtained. Further, the unit of (l2·c2) is a square ($s^2$) of seconds (s) of time. In addition, since FIG. 13 is intended to obtain a value of (l2·c2), the following FIG. 14 is useful to obtain a specific value of inductance l2 and capacitance c2.

Figure 14:
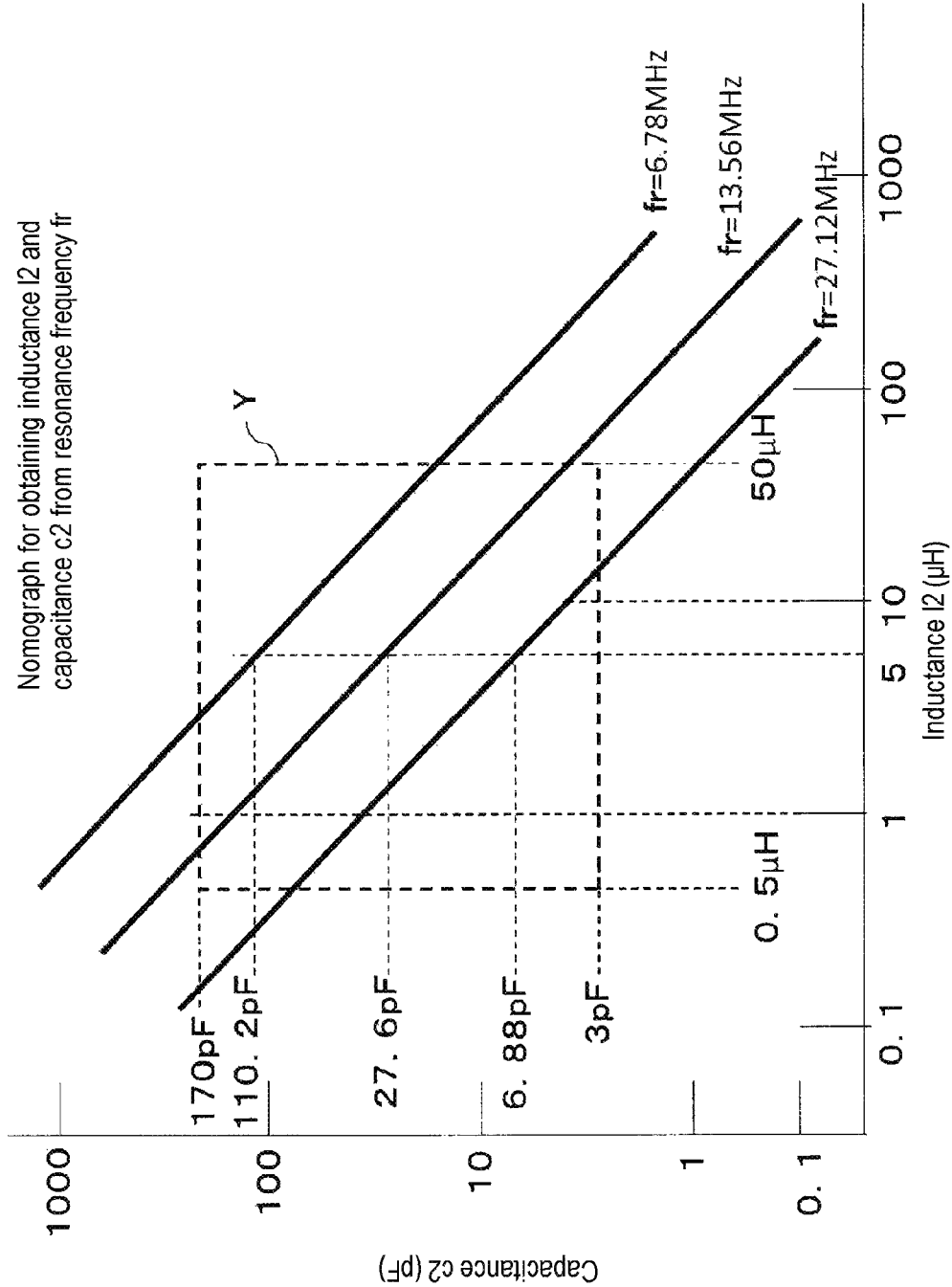
FIG. 14 is a nomograph of obtaining inductance l2 and capacitance c2 necessary for setting a resonance frequency at 6.78 MHz, 13.56 MHz, and 27.12 MHz based on FIG. 12.

FIG. 14 is a nomograph of obtaining inductance l2 and capacitance c2 from the resonance frequency fr. In FIG. 14, the horizontal axis represents inductance l2 of the coil L2 and the vertical axis represents capacitance c2 of the capacitor C2. As parameters for obtaining these values, three resonance frequencies fr of fr=6.78 MHz, fr=13.56 MHz, and fr=27.12 MHz are illustrated. The resonance frequency fr=6.78 MHz and the resonance frequency fr=13.56 MHz are currently used, but the resonance frequency fr=27.12 MHz is not considered to be used yet. In the light of a future technology request and technological innovation, the present inventor predicts a frequency of double the resonance frequency fr=13.56 MHz. For example, when the inductance l2 of the coil L2 is fixed to 50l, the capacitance c2 of the capacitor C2 is c2=27.6 pF if the resonance frequency fr is to be set at fr=13.56 MHz and the capacitance c2 is c2=110.2 pF if the resonance frequency fr is to be set at fr=6.78 MHz. Similarly, if the resonance frequency fr is to be set at fr=27.12 MHz, the capacitance c2 of the capacitor C2 is c2=6.88 pF. Thus, in a case where the resonance frequency fr is set to fall within a range of 6.78 to 27.12 MHz, an adjustment range of the capacitance c2 of the capacitor C2 is 110.2 to 6.88 pF. When about 50% of margin is taken in this adjustment range, an adjustment range of the capacitance c2 is 170 to 3 pF. Further, when the resonance frequency fr is adjusted, the capacitance, rather than the inductance of a coil, is generally adjusted, but the capacitance may be fixed and inductance may be adjusted. In addition, both the capacitance and inductance may be adjusted to adjust a wider range of the resonance frequency although it incurs high cost.

A range of the inductance l2 and capacitance c2 used in the range of the resonance frequency fr=6.78 to 27.12 MHz is illustrated in FIG. 14, but a range of the inductance l2 experimentally obtained by the present inventor may be 0.5 to 100 pH. The range may be 0.9 to 50 pH. When the inductance l2 is manufactured to be 0.5 pH or less, it is difficult to precisely control the value. Further, when a relatively high inductance of 50 pH or more is manufactured, an area occupied in the medium is increased and is not physically desirable. Thus, in order to frequently change among three resonance frequencies fr=6.78 MHz, fr=13.56 MHz, and fr=27.12 MHz, the capacitance c2 and the inductance l2 may be adjusted within a range indicated by sign Y.

Figure 15:
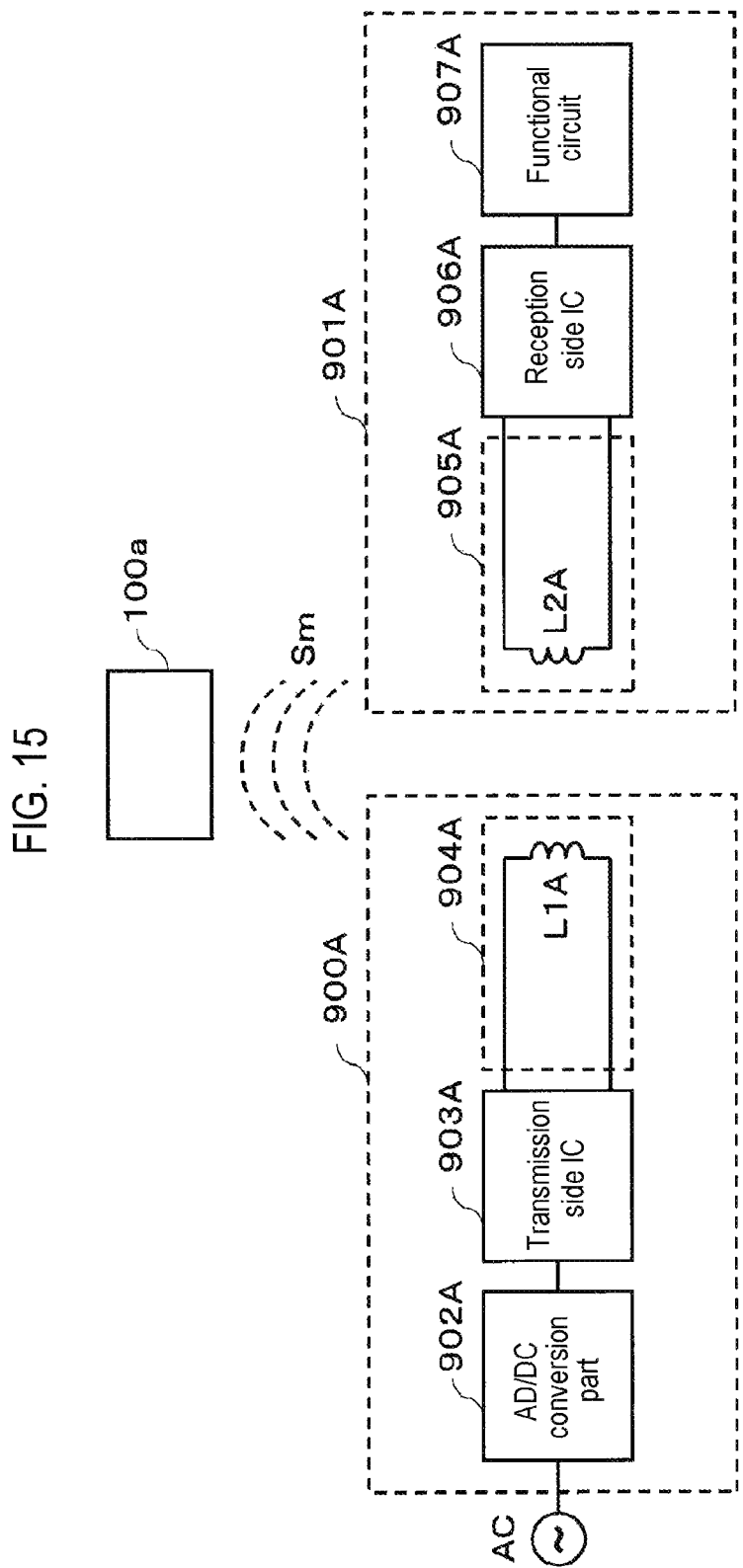
FIG. 15 is a schematic overview illustrating a state in which the contactless communication medium according to the present disclosure is exposed to a magnetic field radiated from an electromagnetic inductive type electronic device.

FIG. 15 is a schematic overview illustrating a state in which the contactless communication medium 100 according to the present disclosure is exposed to a magnetic field radiated from an electromagnetic inductive type electronic device. FIGS. 1 to 14 as described above are based on the magnetic resonance scheme, but FIG. 15 illustrates a state in which the contactless communication medium according to the present disclosure is exposed to an electromagnetic inductive type electronic device different from FIGS. 1 to 14. The electromagnetic inductive scheme is employed in, for example, a Qi scheme, the frequency is 100 to 200 KHz, and the power transmission side and the power reception side have no resonance circuit. The electromagnetic inductive scheme is superior to the magnetic resonance scheme in transmission efficiency, but is known to have a problem in heating or the degree of freedom in a position of a medium. As described above, the concept of the magnetic field strength is also applied to the electromagnetic inductive scheme.

The electronic device 900 illustrated in FIG. 15 includes a contactless communication medium 100a, a wireless power feeder 900A, and a wireless power receiver 901A of the present disclosure. The wireless power feeder 900A and the wireless power receiver 901A are electronic devices in the present disclosure, but the contactless communication medium 100a handled in the present disclosure may or may not be appropriate for contactless communication with these electronic devices. When appropriate, the contactless communication medium transmits and receives various information signals to and from these electronic devices. Further, the contactless communication medium 100a according to the present disclosure is completely independent of these electronic devices, and there are not a few cases where various information signals are not transmitted to or received from these electronic devices.

When the contactless communication medium 100 approaches the wireless power feeder 900A or when the contactless communication medium 100 is placed between the wireless power feeder 900A and the wireless power receiver 901A, the contactless communication medium 100 may receive a strong magnetic field than an allowable level. Thus, it is considered that various kinds of information retained by the medium may be deteriorated or damaged. Since the contactless communication medium 100 include less amount of, for example, a identification number, identification information, value information, credit information and the like of a person, it is necessary to protect the contactless communication medium 100 from being deteriorated or damaged.

The wireless power feeder 900A of FIG. 15 includes, for example, an AC/DC conversion part 902A, a power transmission side IC 903A, and a power transmission side coil 904A. The coil 904A includes a coil L1A, but a capacitor (not shown) and the coil L1A may be often connected in series or in parallel under a condition that they do not constitute a resonance circuit. The wireless power receiver 901A includes a power reception side coil 905A, a power reception side IC 906A, and a functional circuit 907A. The power reception side coil 905A and a coil L1A (not shown) may be often connected in series or in parallel under a condition that they do not constitute a resonance circuit. Of course, in order to switch the electromagnetic inductive scheme to the magnetic resonance scheme, a capacitor (not shown) that may be connected in series or in parallel to the coil L2A may also be used in the power reception side coil 905A. The wireless power receiver 901A may be, for example, a mobile phone, a smartphone, a portable information terminal, a table personal computer, a digital camera, or the like.

The AC/DC conversion part 902A generates a DC voltage having a predetermined voltage from an AC voltage AC, and outputs the same. The power transmission side IC 903A operates depending on an output voltage from the AC/DC conversion part 902A to allow an AC current to flow through the coil 904A. Thus, the coil 904A generates a magnetic field having a predetermined frequency in the coil L1A.

When the magnetic field having a predetermined frequency is received, the coil L2A of the power reception side coil 905A allows the AC current to flow through the power reception side IC 906A. Thus, the power reception side IC 906A operates. The power reception side IC 906A includes a rectifying circuit (not shown) and the like. Although a specific rectifying circuit will be described later, the rectifying circuit 20A, the rectifying circuit 20B, and the rectifying circuit 20C respectively illustrated in FIGS. 3, 4 and 5 already described may be used. The functional circuit 907A operates by the power reception side IC 906A. The functional circuit 907A realizes a certain function to be realized by the wireless power receiver 901A. For example, a circuit configuration which is the same as that of the functional circuit 70 illustrated in FIG. 3 may be adopted for the circuit configuration of the functional circuit 907A.

When the contactless communication medium 100a is present within a predetermined range of the wireless power feeder 900A and the wireless power receiver 901A, the wireless power feeder 900A and the wireless power receiver 901A may use the electromagnetic induction to perform communication, power transmission, power reception, and the like.

Figure 16:
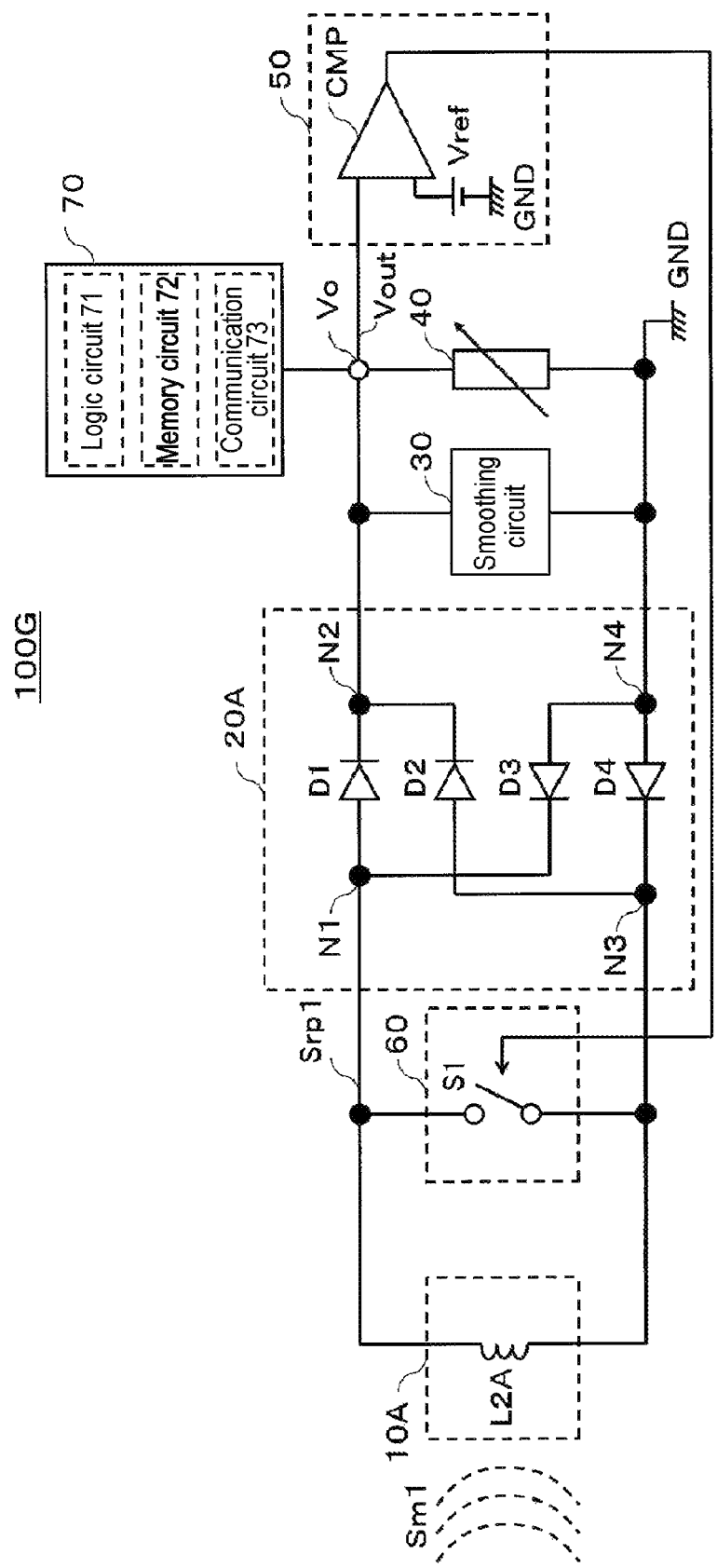
FIG. 16 is a circuit diagram of a contactless communication medium according to a second embodiment of the present disclosure having a possibility of being exposed to the electronic device illustrated in FIG. 13.
Figure 17:
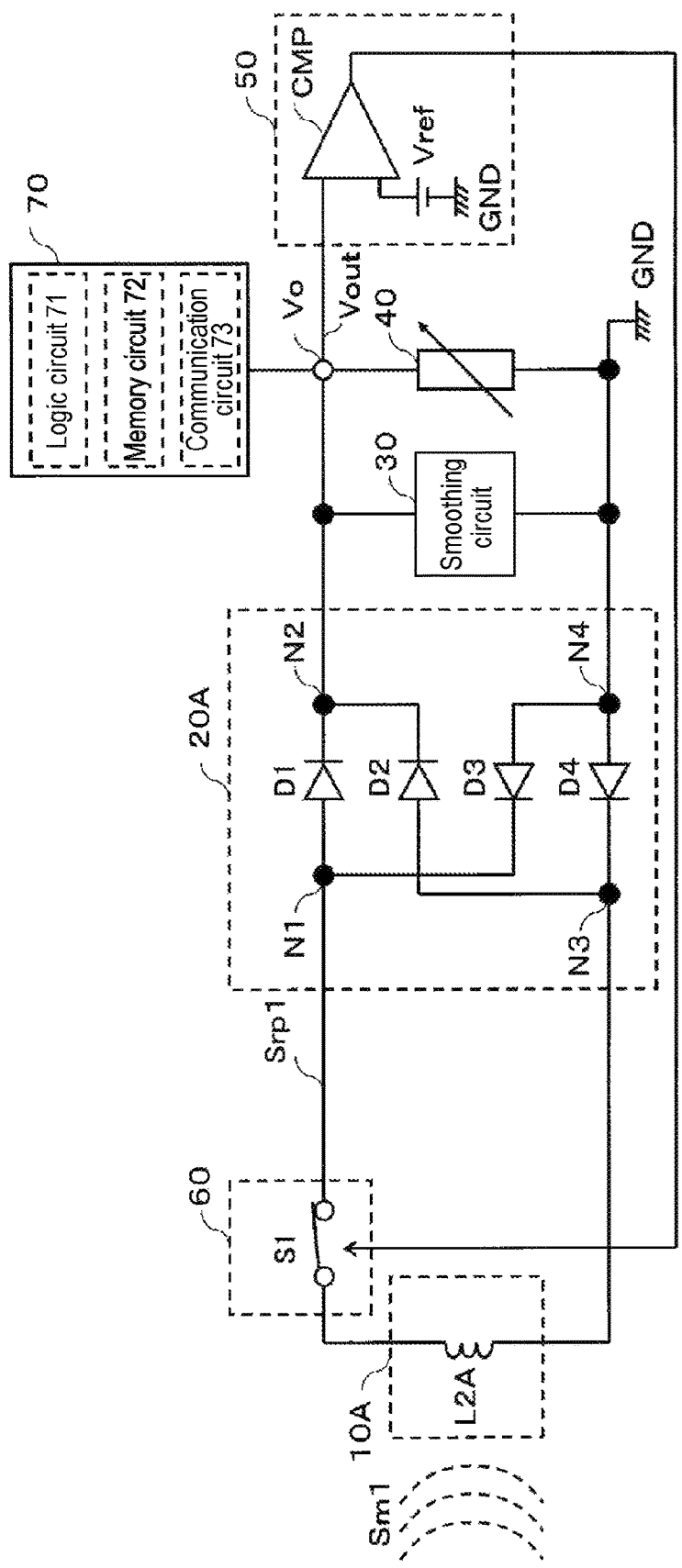
FIG. 17 illustrates a modification of the embodiment of FIG. 16.

FIG. 16 illustrates a contactless communication medium according to the present disclosure appropriate for the electromagnetic inductive scheme illustrated in FIG. 15. A contactless communication medium 100G is almost similar to the magnetic resonance scheme in circuit configuration and is very similar to the contactless communication medium 100A illustrated in FIG. 3. In short, a difference between the contactless communication medium 100G illustrated in FIG. 16 and the contactless communication medium 100A illustrated in FIG. 3 is that a capacitor to be resonated with a coil is not employed in the contactless communication medium 100G The others are almost the same.

The contactless communication medium 100G includes a coil 10A (L2A), a rectifying circuit 20, a smoothing circuit 30, a load impedance adjusting means 40, a voltage detecting circuit 50, a switch 60, and a functional circuit 70.

The coil 10A includes a coil L2A. The coil L2A and the coil 10A of the contactless communication medium of FIG. 16 and are illustrated to be the same, but since the coil L2A may include a capacitor (not shown), the coil L2A is indicated by a different reference numeral. The coil 10A is arranged close to an input magnetic field Sml and is sensitive to a magnetic flux generated at the input magnetic field Sn. The coil 10A (L2A) is selected in a range of, for example, 0.5 to 50 µH.

The rectifying circuit 20 is used to convert an output magnetic force Sp1 extracted from the coil 10A into a DC voltage. The rectifying circuit 20 is constituted by diode elements D1 to D4. An anode and a cathode of the diode element D1 are respectively connected to a node N1 and a node N2. An anode and a cathode of the diode element D2 are respectively connected to a node N3 and the node N2. An anode and a cathode of the diode element D3 are respectively connected to a node N4 and the node N1. An anode and a cathode of the diode element D4 are respectively connected to the node N4 and the node N3. The rectifying circuit constituted by the diode elements D1 to D4 is referred to as a full-wave rectifier. Further, the rectifying circuit may be constituted, for example, by a half-wave rectifier with two diodes, not four diodes of the diode elements D1 to D4. As the diode elements D1 to D4, for example, any one of silicon PN junction diodes, Schottky barrier diodes, and MOS transistors may be used.

The smoothing circuit 30 is used to smooth an AC voltage extracted from the node N2, which is an output from the rectifying circuit 20, to a DC voltage. The smoothing circuit 30 is configured as a low pass filter (LPF) formed by combining a capacitor, a coil, and a resistor as described above.

The load impedance adjusting means 40 is used to adjust the output voltage Vout generated at the node N2 to a predetermined magnitude. Here, the predetermined output voltage Vout is set at, for example, 3V disclosed in the related art. The predetermined output voltage Vout is set based on a magnetic field strength within an allowable range of the coil L2. For example, in a case where the coil L2 is the coil PICC1 defined by the ISO/IEC14443 and is exposed to a strong magnetic field of 7.5 A/m (rms), the output voltage Vout is adjusted to be 3V by the load impedance adjusting means 40. Further, according to the ISO/IEC14443, although the contactless communication medium using the coil PICC1 is limited to 30 seconds in an average time as well as 7.5 A/m (rms) in a maximum magnetic field strength Hmax, it is required to withstand up to 8/5(=1.6) times the maximum magnetic field strength Hmax at a frequency of 13.56 MHz. Thus, the contactless communication medium using the coil PICC1 is required to withstand up to a magnetic field strength of 12 A/m, which is 8/5(=1.6) times the magnetic field strength of 7.5 A/m. That is, the contactless communication medium using the coil PICC1 is required to withstand up to 7.5 A/m in a normal state and up to 12 A/m transitionally.

In the ISO/IEC14443, the contactless communication medium using the coil PICC3 is required to withstand 8.5 A/m (rms), which is a maximum magnetic field strength Hmax. Since the definition of 8/5(=1.6) times is also applied thereto, the contactless communication medium using the coil PICC3 is required to withstand 13.6 A/m, which is a substantial maximum magnetic field strength. Thus, when the coil L2 is exposed to a magnetic field strength of 8.5 m/A (rms) or 13.6 A/m (rms), the operation of the voltage detecting circuit 50 is switched by adjustment of the load impedance adjusting means 40 or the like, and the switch 60 is operated such that the sensitivity of the coil L2 to the magnetic field is attenuated (lowered).

Similarly, referring to the coil PICC6, the contactless communication medium using the coil PICC6 is required to withstand 18 A/m (rms) which is the maximum magnetic field strength Hmax. Since the regulation of 8/5(=1.6) times is applied thereto, the contactless communication medium using the coil PICC6 is required to withstand 28.8 A/m, which is a substantial maximum magnetic field strength. In view of this, when a magnetic field applied to the coil L2 exceeds 7.5 A/m, the output voltage Vout is adjusted to be 3V by the load impedance adjusting means 40 in order to make sure that the contactless communication medium 100A according to the present disclosure corresponds to the coil PICC1 to the coil PICC6.

Further, the output voltage Vout may also be adjusted by selecting a type of the diode elements D1 to D4 constituting the rectifying circuit 20. For example, when the diode elements D1 to D4 are configured with Schottky barrier diodes having a small forward voltage rather than as PN junction diodes, the output voltage Vout becomes higher such that the resistance of the load impedance adjusting means 40 is adjusted to a low level. In addition, when the diode elements D1 to D4 are configured with MOS transistors, the level of the output voltage Vout may be adjusted by controlling a threshold voltage of the MOS transistors.

The load impedance adjusting means 40 may also be configured with only a resistor element. Further, the load impedance adjusting means 40 may also be configured with a combination of a resistor and a constant voltage element such as a diode or the like. In addition, the load impedance adjusting means 40 may also be configured with a combination of a resistor, a diode, and a transistor. As will be described hereinbelow, the functional circuit 70 may be used as the load impedance adjusting means 40.

The voltage detecting circuit 50 detects a level of the output voltage Vout output at the output terminal Vo (node N2). The configuration of the voltage detecting circuit 50 may be the simplest when it is configured with only a comparator CMP1 stage, but another comparator (not shown) may also be provided to form a window comparator with the two comparators. For example, when the output voltage Vout is within a range of 2 to 3V, the output may be switched. The voltage detecting circuit 50 outputs a voltage or a signal when the output voltage Vout is, for example, 3V.

Further, the voltage detecting circuit 50 may monitor a source voltage Vout supplied to the functional circuit 70, and may also serve to suppress an overvoltage supplied to the functional circuit 70.

The switch 60 controls the coil 10A (L2A) in response to an output from the voltage detection circuit 50. A simplest control method is to short-circuit both ends of coil L2A. The switch 60 is in an open state (open) in a normal state, and supplies an electromagnetic force generated in the coil 10A to the rectifying circuit 20A. The switch 60 short-circuits the coil 10A (L2A) in response to an operation of the voltage detecting circuit 50. In the voltage detecting circuit 50, when the output voltage Vout reaches a predetermined value (e.g., 3V), an output logic is inverted to turn on or off the switch 60. The coil 10A (coil L2A) is short-circuited. When the coil 10A is short-circuited, the electromagnetic force supplied to the rectifying circuit 20A disappears and the output voltage Vout becomes almost 0. When the output voltage Vout is 0V, a source voltage supplied to the functional circuit 70 becomes almost 0 and various information data retained by the functional circuit 70 is prevented from being deteriorated or damaged.

The functional circuit 70 operates using the output voltage Vout generated at the node N3 as a source voltage. The functional circuit 70 includes, for example, a logic circuit 71, a memory circuit 72, and a communication circuit 73. The communication circuit 73 performs communication with the wireless power feeder 900A illustrated in FIG. 15 or various electronic devices (not shown). The functional circuit 70 does not necessarily have a communication function, and in that case, the communication circuit 73 is not necessary.

In the contactless communication medium according to the present disclosure, when a magnetic field or electromagnetic force higher than an allowable level is applied to a coil of the contactless communication medium, it rectifies such a magnetic field or electromagnetic force to convert it into a DC voltage, compares this DC voltage with a reference voltage, and makes an alternating voltage output from the coil be 0 or attenuates it, regardless of whether a magnetic resonance scheme or an electromagnetic inductive scheme is used. Thus, a source voltage applied to the functional circuit that operates using the magnetic field or electromagnetic force as power energy becomes 0 or is reduced, thereby preventing various kinds of information retained by the functional circuit from being deteriorated or damaged. This contactless communication medium can be widely used, and thus, the present disclosure has high industrial applicability.

According to some embodiments of the present disclosure, even when a "contactless communication medium" is exposed to a strong magnetic field generated from an electronic device such as a reader/writer, it is possible to provide a contactless communication medium capable of preventing occurrence of received voltage exceeding a predetermined value by operating a circuit for attenuating the magnetic field energy.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A contactless communication medium, comprising:
a coil sensitive to a magnetic field;
a rectifying circuit configured to rectify an alternating power energy generated in the coil;
a smoothing circuit configured to smooth a rectified output outputted from the rectifying circuit to generate a DC voltage;
an output terminal connected to the smoothing circuit;
a voltage detecting circuit configured to compare an output voltage extracted from the output terminal with a reference voltage;
a switch configured to operate in response to an output from the voltage detection circuit and to attenuate the alternating power energy generated in the coil when the output voltage reaches a predetermined value; and
a load connected to the output terminal,
wherein an impedance of the load has a value such that the output voltage has a predetermined value when an effective value of the magnetic field applied to the coil is 12 A/m or more.

2. The contactless communication medium of claim 1, wherein the load is connected in parallel or in series to the smoothing circuit such that a discharge time constant of the smoothing circuit has a value based on the impedance of the load.

3. The contactless communication medium of claim 2, wherein the load is a fixed resistor.

4. The contactless communication medium of claim 2, wherein the load is a variable resistor.

5. The contactless communication medium of claim 1, wherein the load is within a range of 30 to 500 Ω.

6. The contactless communication medium of claim 1, wherein sensitivity of the coil to the magnetic field is attenuated when the effective value of the magnetic field is 13.6 A/m (rms) or more.

7. The contactless communication medium of claim 6, wherein the sensitivity of the coil to the magnetic field is attenuated when the effective value of the magnetic field is 18 A/m (rms) or more.

8. The contactless communication medium of claim 7, wherein the sensitivity of the coil to the magnetic field is attenuated when the effective value of the magnetic field is 28.8 A/m (rms) or more.

9. The contactless communication medium of claim 1, wherein the effective value of the magnetic field conforms to the specification of ISO14443.

10. The contactless communication medium of claim 1, wherein 12 A/m (rms), which is the effective value of the magnetic field, is applied to PICC1 of ISO14443.

11. The contactless communication medium of claim 6, wherein 13.6 A/m (rms), which is the effective value of the magnetic field, is applied to PICC3 of ISO14443.

12. The contactless communication medium of claim 7, wherein 18 A/m (rms), which is the effective value of the magnetic field, is applied to PICC6 of ISO14443.

13. The contactless communication medium of claim 8, wherein 28.8 A/m (rms), which is the effective value of the magnetic field, is applied to PICC6 of ISO14443.

14. The contactless communication medium of claim 1, wherein the output voltage is 3V.

15. The contactless communication medium of claim 1, further comprising a functional circuit connected to the output terminal, wherein a source voltage of the functional circuit is the output voltage output from the output terminal.

16. The contactless communication medium of claim 15, wherein a maximum rated source voltage of the functional circuit is equal to or less than the output voltage.

17. The contactless communication medium of claim 1, wherein a capacitor is connected in parallel or in series to the coil to form a resonance circuit, and
wherein an inductance of the coil and a capacitance of the capacitor have values respectively such that the resonance frequency of the resonance circuit is within a range of 100 KHz to 27.12 MHz.

18. The contactless communication medium of claim 17, wherein, when a magnitude of the inductance of the coil is l2 and the capacitance of the capacitor is c2, l2·c2 as a product of l2 and c2 is within a range of $1.72 \times 10^{-17}$ ($s^2$) to $8.27 \times 10^{-16}$ ($s^2$).

19. The contactless communication medium of claim 18, wherein the capacitance c2 is within a range of 3 to 170 pF.

20. The contactless communication medium of claim 18, wherein the inductance l2 is within a range of 0.5 to 100 μH.

21. The contactless communication medium of claim 20, wherein the inductance l2 is within a range of 0.9 to 50 μH.

22. The contactless communication medium of claim 1, wherein the rectifying circuit is constituted with a full-wave rectifying circuit or a half-wave rectifying circuit formed of diode elements.

23. The contactless communication medium of claim 22, wherein the diode elements are configured with any one of PN junction diodes, Schottky barrier diodes, and MOS transistors.

24. An electronic device configured to write or read information into or from the contactless communication medium of claim 1 that performs contactless communication with the contactless communication or supply a driving current to the coil of the contactless communication medium.

25. The electronic device of claim 24, wherein the electronic device is applied to any one of a Qi scheme, an A4WP scheme, an NFC scheme, and a PMA scheme.

* * * * *